(12) United States Patent
Takahashi

(10) Patent No.: US 12,135,912 B2
(45) Date of Patent: Nov. 5, 2024

(54) CONTROL DEVICE, CONTROL METHOD, AND CONTROL PROGRAM

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/188,833

(22) Filed: Mar. 23, 2023

(65) Prior Publication Data

US 2023/0305793 A1    Sep. 28, 2023

(30) Foreign Application Priority Data

Mar. 25, 2022   (JP) ................................ 2022-050808

(51) Int. Cl.
| | |
|---|---|
| *G06F 3/14* | (2006.01) |
| *G02B 27/01* | (2006.01) |
| *G06F 3/01* | (2006.01) |
| *G06T 7/11* | (2017.01) |

(52) U.S. Cl.
CPC ......... *G06F 3/1454* (2013.01); *G02B 27/017* (2013.01); *G06T 7/11* (2017.01); *G02B 2027/0178* (2013.01); *G06F 3/013* (2013.01)

(58) Field of Classification Search
None
See application file for complete search history.

(56) References Cited

U.S. PATENT DOCUMENTS

| | | | | |
|---|---|---|---|---|
| 11,003,410 B2 * | 5/2021 | Blume | ................... | G09G 5/005 |
| 11,507,336 B2 * | 11/2022 | Blume | .................. | G06F 3/1454 |
| 2008/0062297 A1 * | 3/2008 | Sako | ...................... | H04N 23/66 |
| | | | | 348/E5.022 |
| 2013/0241955 A1 * | 9/2013 | Tamaru | ................ | H04N 13/344 |
| | | | | 345/633 |
| 2016/0049108 A1 * | 2/2016 | Yajima | ................ | A63F 13/5255 |
| | | | | 345/212 |
| 2017/0266554 A1 * | 9/2017 | Marks | ................. | A63F 13/5255 |
| 2017/0308157 A1 * | 10/2017 | Tsuda | ...................... | H04W 4/80 |
| 2018/0041699 A1 * | 2/2018 | Tohara | ................ | H04N 13/344 |
| 2018/0249086 A1 * | 8/2018 | Ozawa | .............. | G02B 27/0172 |
| 2019/0060756 A1 | 2/2019 | Marks et al. | | |

(Continued)

FOREIGN PATENT DOCUMENTS

JP    2019-516159 A    6/2019

OTHER PUBLICATIONS

Extended European Search Report for corresponding European Application No. 23162119.4, dated Aug. 11, 2023.

*Primary Examiner* — Dorothy Harris
(74) *Attorney, Agent, or Firm* — Birch, Stewart, Kolasch & Birch, LLP

(57) ABSTRACT

A control device includes at least one processor. In a case in which a first user observes a captured image, which is picked up by a camera of a glasses-type display device, using the glasses-type display device and a second user observes the captured image using a display device different from the glasses-type display device, the processor is configured to perform a control to output a first image, which is obtained through an image pickup control on the basis of a first region of the captured image, to the glasses-type display device and to output a second image, which is obtained through an image pickup control on the basis of a second region of the captured image, to the display device.

10 Claims, 14 Drawing Sheets

(56) References Cited

U.S. PATENT DOCUMENTS

| | | | |
|---|---|---|---|
| 2019/0250873 A1* | 8/2019 | Blume | G16H 20/40 |
| 2021/0003969 A1* | 1/2021 | Gelman | G03H 1/2294 |
| 2022/0075449 A1* | 3/2022 | Blume | G06F 3/011 |
| 2023/0169723 A1* | 6/2023 | Uhm | G06T 7/50 |
| | | | 345/419 |

* cited by examiner

CONTROL DEVICE, CONTROL METHOD, AND CONTROL PROGRAM

CROSS REFERENCE TO RELATED APPLICATIONS

This application claims priority from Japanese Application No. 2022-050808, filed on Mar. 25, 2022, the entire disclosure of which is incorporated herein by reference.

BACKGROUND

1. Technical Field

The present disclosure relates to a control device, a control method, and a non-transitory storage medium storing a control program.

2. Related Art

A technique that allows a user other than a specific user to also observe an image observed by the specific user using a glasses-type display device is known in the related art. For example, JP2019-516159A discloses a technique that shares contents included in virtual reality contents, which are visually recognized by a player wearing a head-mounted display, with other spectators. In the technique disclosed in JP2019-516159A, an image to be provided to a spectator is scaled up or down according to the position of the spectator.

According to the technique disclosed in JP2019-516159A, although the size of an image displayed according to the position of the spectator is an appropriate size, it may not be said that the image is an image appropriate for the spectator to observe.

SUMMARY

The present disclosure has been made in consideration of the above-mentioned circumstances, and an object of the present disclosure is to provide a control device, a control method, and a non-transitory storage medium storing a control program that can provide a first image suitable for observation performed by a first user and a second image suitable for observation performed by a second user.

A control device according to a first aspect of the present disclosure comprises at least one processor. In a case in which a first user observes a captured image, which is picked up by a camera of a glasses-type display device, using the glasses-type display device and a second user observes the captured image using a display device different from the glasses-type display device, the processor is configured to perform a control to output a first image, which is obtained through an image pickup control on the basis of a first region of the captured image, to the glasses-type display device and to output a second image, which is obtained through an image pickup control on the basis of a second region of the captured image, to the display device.

According to a second aspect of the present disclosure, in the control device according to the first aspect, the processor performs a control to cause the camera to pick up one captured image in a dynamic range, which is suitable for image pickup of a subject captured in the first region and image pickup of a subject captured in the second region, as the image pickup control, and performs a control to output the first image and the second image obtained from the one captured image.

According to a third aspect of the present disclosure, in the control device according to the second aspect, the processor is configured to adjust a luminance value of the one captured image to a luminance value for the glasses-type display device to generate the first image, and adjust a luminance value of the one captured image to a luminance value for the display device to generate the second image.

According to a fourth aspect of the present disclosure, in the control device according to the first aspect, the processor is configured to perform a control to set a focusing position of an optical system of the camera between a first focusing position where the optical system is focused on a subject captured in the first region and a second focusing position where the optical system is focused on a subject captured in the second region and to cause the camera to pick up one captured image in a state in which the focusing position is set, as the image pickup control, and performs a control to output the first image and the second image obtained from the one captured image.

According to a fifth aspect of the present disclosure, in the control device according to the first aspect, the processor is configured to use a first captured image, which is picked up in a state in which an exposure of the camera is controlled on the basis of a subject captured in the first region, as the first image, and use a second captured image, which is picked up in a state in which an exposure of the camera is controlled on the basis of a subject captured in the second region, as the second image.

According to a sixth aspect of the present disclosure, in the control device according to any one of the first to fifth aspects, the second image is a partial image that is obtained by cutting out the second region from the captured image.

According to a seventh aspect of the present disclosure, in the control device according to any one of the first to sixth aspects, the processor is configured to determine the first region on the basis of a visual line of the first user that is detected by a visual line detection device.

A control method according to an eighth aspect of the present disclosure is a control method that is performed by a processor included in a control device. In a case in which a first user observes a captured image, which is picked up by a camera of a glasses-type display device, using the glasses-type display device and a second user observes the captured image using a display device different from the glasses-type display device, the method comprises performing a control to output a first image, which is obtained through an image pickup control on the basis of a first region of the captured image, to the glasses-type display device and to output a second image, which is obtained through an image pickup control on the basis of a second region of the captured image, to the display device.

A non-transitory storage medium storing a control program according to a ninth aspect of the present disclosure is executable by a processor included in a control device. In a case in which a first user observes a captured image, which is picked up by a camera of a glasses-type display device, using the glasses-type display device and a second user observes the captured image using a display device different from the glasses-type display device, the control program causes the processor to perform a control to output a first image, which is obtained through an image pickup control on the basis of a first region of the captured image, to the glasses-type display device and to output a second image, which is obtained through an image pickup control on the basis of a second region of the captured image, to the display device.

According to the present disclosure, it is possible to provide a first image suitable for observation performed by a first user and a second image suitable for observation performed by a second user.

DETAILED DESCRIPTION

Examples of an embodiment of a technique of the present disclosure will be described in detail below with reference to the drawings.

First Embodiment

Figure 1:
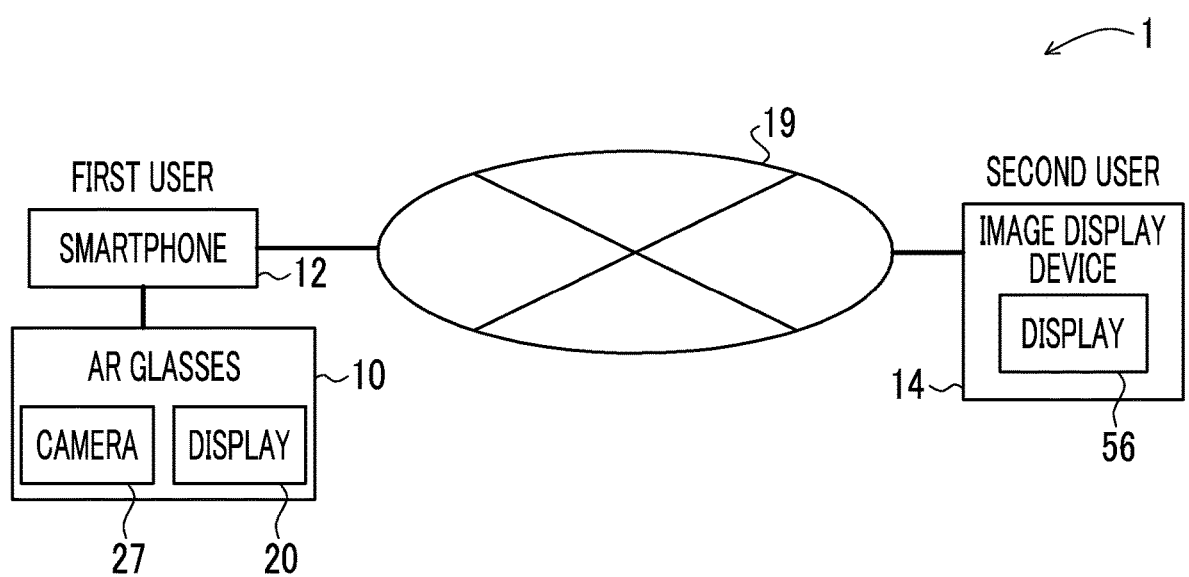
FIG. 1 is a diagram showing an example of the configuration of an image display system of an embodiment.

The configuration of an image display system 1 of the present embodiment will be described with reference to FIG. 1. As shown in FIG. 1, the image display system 1 of the present embodiment comprises augmented reality (AR) glasses 10, a smartphone 12, and an image display device 14. The smartphone 12 and the image display device 14 are connected to each other through a network 19 via wired communication or wireless communication. The AR glasses 10 of the present embodiment are an example of a glasses-type display device of the present disclosure, and the smartphone 12 of the present embodiment is an example of a control device of the present disclosure. Further, the image display device 14 of the present embodiment is an example of a display device different from the glasses-type display device of the present disclosure.

The image display system 1 of the present embodiment has a function of displaying a captured image of a real world, which is picked up by a camera 27 of the AR glasses 10, on a display 20 of the AR glasses 10 and a display 56 of the image display device 14. That is, according to the image display system 1 of the present embodiment, a user of the image display device 14 can also visually recognize the real world that is visually recognized by a user of the AR glasses 10. Hereinafter, a user who uses the AR glasses 10 will be referred to as a "first user" and a user who uses the image display device 14 will be referred to as a "second user". In a case in which both the users are collectively called without distinction, both the users will be simply referred to as "users".

Figure 2:
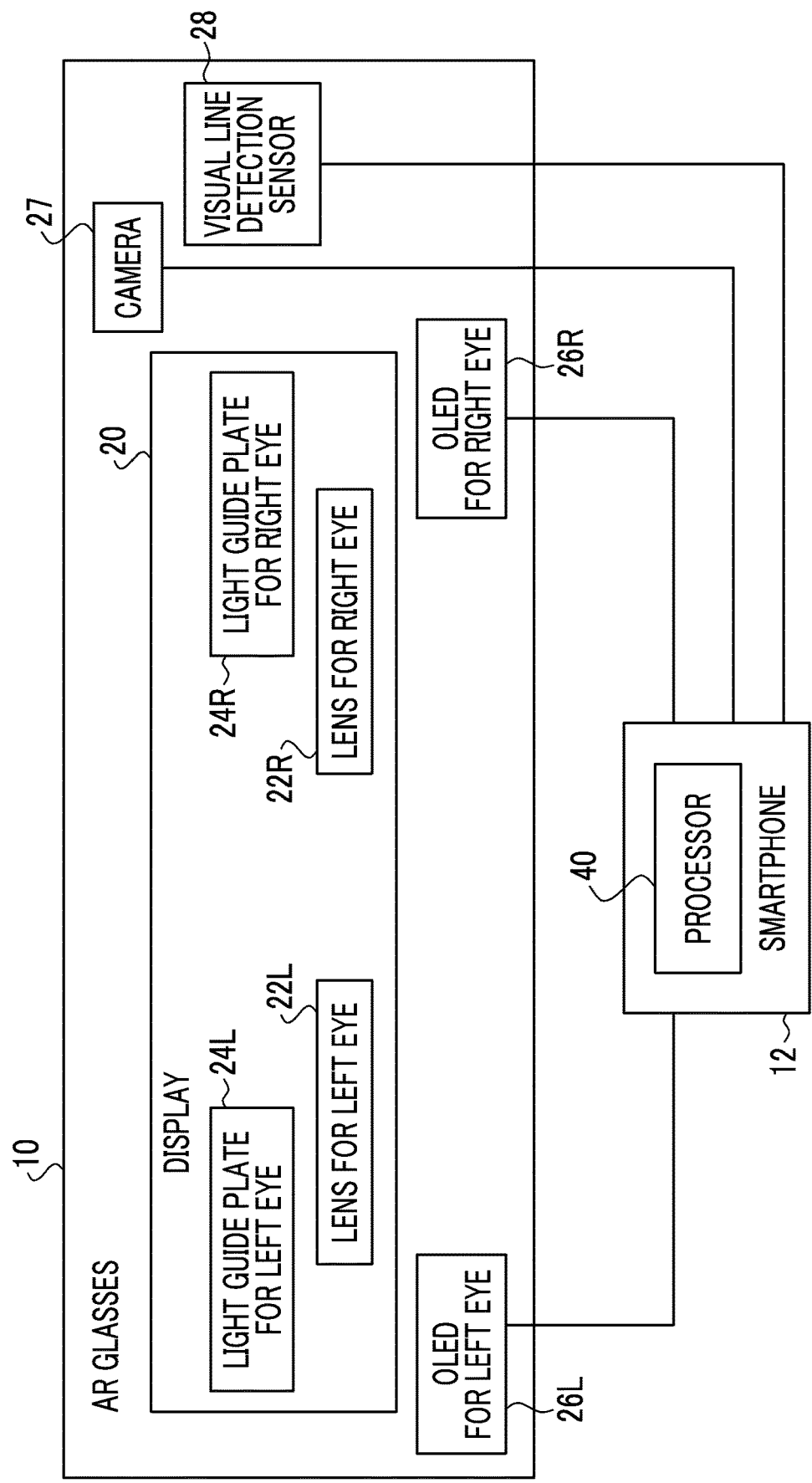
FIG. 2 is a diagram showing an example of the configuration of AR glasses and a smartphone.

The configuration of the AR glasses 10 and the smartphone 12 of the present embodiment will be described with reference to FIG. 2. The AR glasses 10 are a device that projects a projection image for a left eye onto a lens 22L for a left eye from an organic light emitting diode (OLED) 26L and projects a projection image for a right eye onto a lens 22R for a right eye from an OLED 26R for a right eye to allow a user to visually recognize an image corresponding to each projection image. In a case where the "projection image for a left eye" and the "projection image for a right eye" are collectively called in the following description, the "projection image for a left eye" and the "projection image for a right eye" will be referred to as "projection images".

Figure 3:
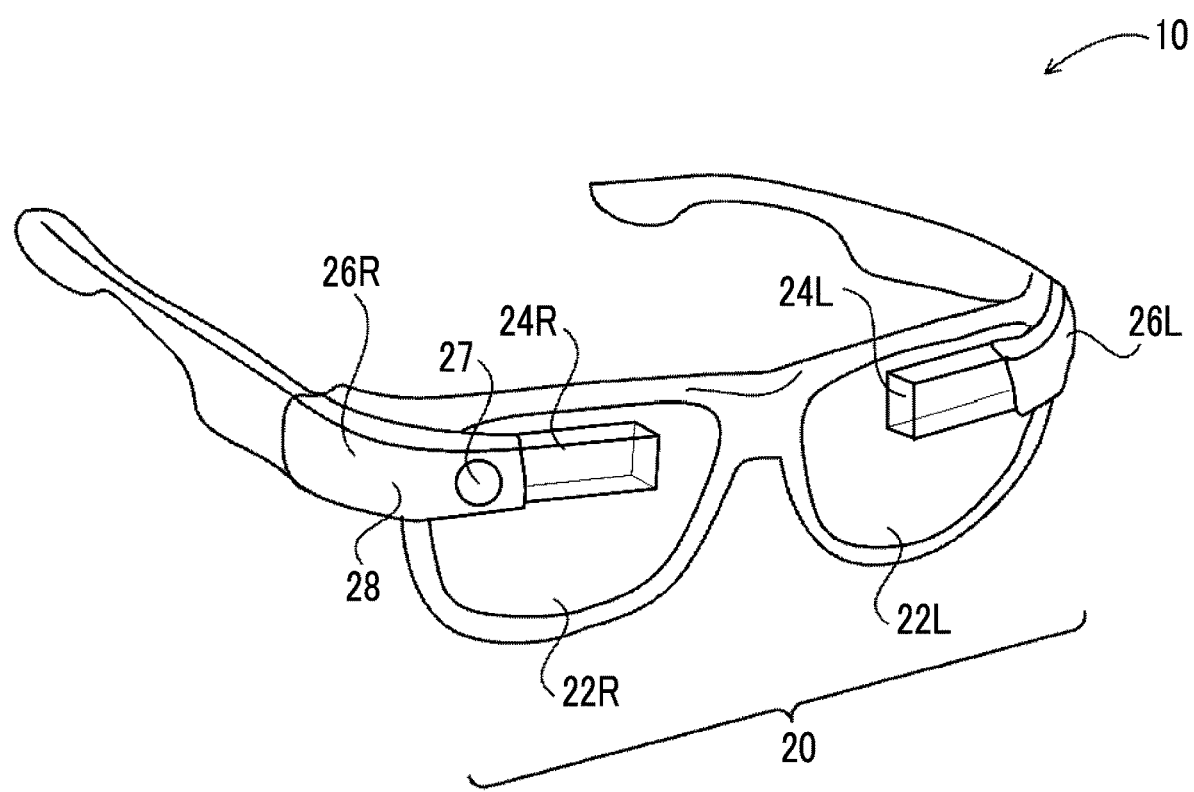
FIG. 3 is a perspective view showing an example of the AR glasses of the embodiment.

FIG. 3 is a perspective view of an example of the AR glasses 10 of the present embodiment. As shown in FIGS. 2 and 3, the AR glasses 10 comprises a display 20, an OLED 26L for a left eye, an OLED 26R for a right eye, a camera 27, and a visual line detection sensor 28. Further, the display 20 includes a lens 22L for a left eye, a light guide plate 24L for a left eye, a lens 22R for a right eye, and a light guide plate 24R for a right eye.

Light corresponding to the projection image for a left eye, which is projected from the OLED 26L for a left eye, is incident on one end of the light guide plate 24L for a left eye. The direction of the light propagated through the light guide plate 24L for a left eye is changed at an emission portion (not shown), and the light is emitted toward the left eye of the first user. The light, which is emitted from the light guide plate 24L for a left eye and corresponds to the projection image for a left eye, is transmitted through the lens 22L for a left eye and is guided to the left eye of the first user. Likewise, light corresponding to the projection image for a right eye, which is projected from the OLED 26R for a right eye, is incident on one end of the light guide plate 24R for a right eye. The direction of the light propagated through the light guide plate 24R for a right eye is changed at an emission portion (not shown), and the light is emitted toward the right eye of the first user. The light, which is emitted from the light guide plate 24R for a right eye and corresponds to the projection image for a right eye, is transmitted through the lens 22R for a right eye and is guided to the right eye of the first user. For this reason, while the projection image is projected from each of the OLED 26L for a left eye and the OLED 26R for a right eye, a display image corresponding to each projection image, for example, a captured image picked up by the camera 27 is visually recognized by each of the left and right eyes of the first user.

Figure 4:
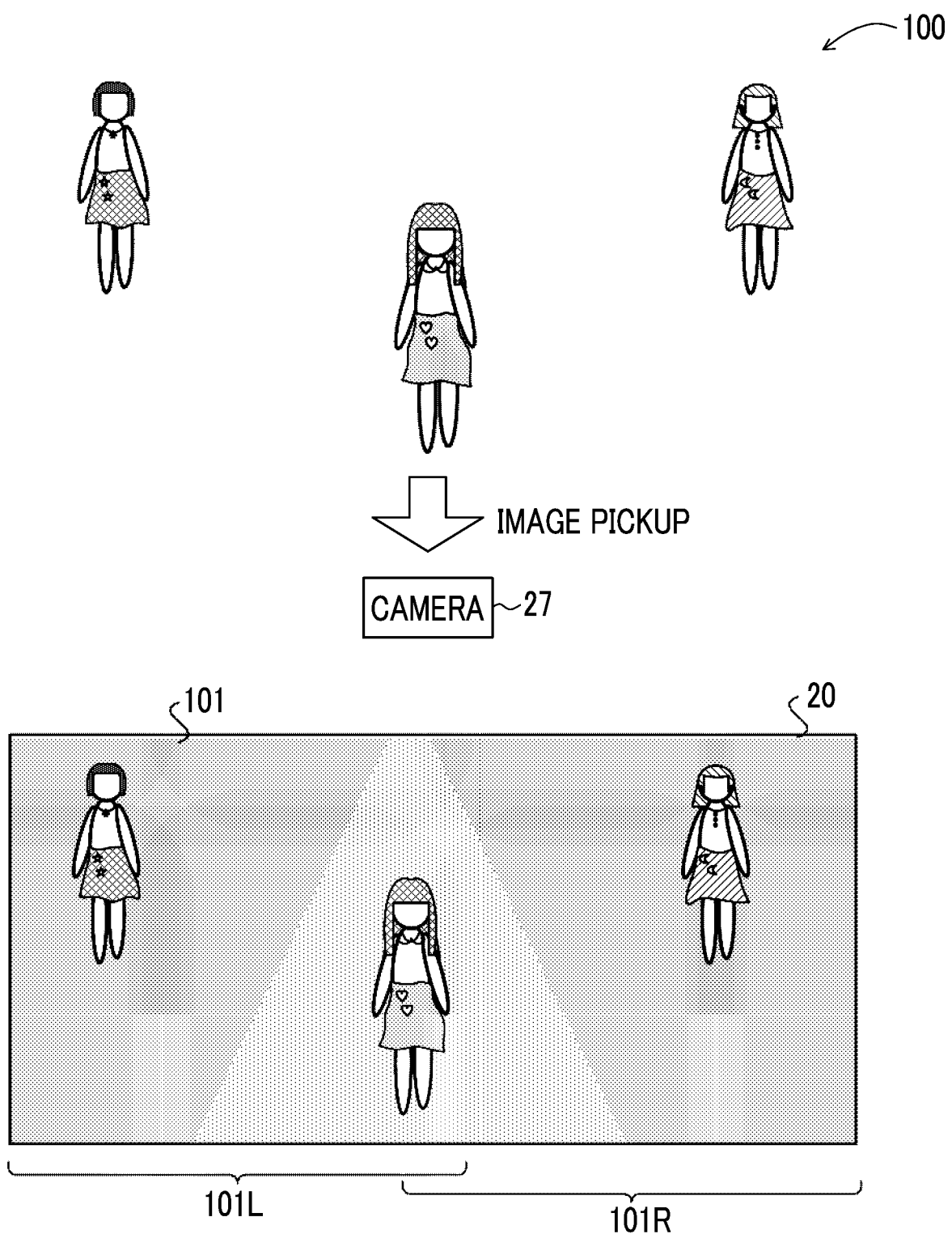
FIG. 4 is a diagram illustrating a captured image that is visually recognized with the AR glasses.

As described above, each of the OLED 26L for a left eye and the OLED 26R for a right eye projects a projection image, which corresponds to the display image displayed on a display 20, onto each of the light guide plate 24R for a right eye and the OLED 26R for a right eye. Since the first user visually recognizes the projection image for a left eye, which is projected onto the light guide plate 24L for a left eye from the OLED 26L for a left eye, with the left eye and visually recognizes the projection image for a right eye, which is projected onto the light guide plate 24R for a right eye from the OLED 26R for a right eye, with the right eye, the display images are combined with each other in the brain of the first user and the first user visually recognizes the display images. For example, in a case where a captured image 101 of a real world 100, which is picked up by the camera 27, is to be displayed on the display 20 as a display image as shown in FIG. 4, the OLED 26L for a left eye projects an image of a left portion of the captured image 101 onto the light guide plate 24L for a left eye as a projection image 101L for a left eye and the OLED 26R for a right eye projects an image of a right portion of the captured image 101 onto the light guide plate 24R for a right eye as a projection image 101R for a right eye. The first user visually recognizes the projection image 101L for a left eye, which is projected onto the light guide plate 24L for a left eye, with the left eye and visually recognizes the projection image 101R for a right eye, which is projected onto the light guide plate 24R for a right eye, with the right eye. As a result, the first user can visually recognize the captured image 101.

The camera 27 is a camera picking up an image of the real world that is observed by the first user. Examples of the camera 27 include a digital camera, such as a complementary metal oxide semiconductor (CMOS) camera. In the present embodiment, the camera 27 can pick up a color image in order to provide an image, which represents the real world, to the user. Further, the camera 27 of the present embodiment is a camera that can have a region equivalent to the range of the field of view of the first user as an image pickup range and uses a so-called fisheye lens or a wide-angle lens. A region equivalent to the range of the field of view of the first user is the image pickup range of the camera 27 in the present embodiment as described above, but the present disclosure is not limited to the embodiment. The image pickup range of the camera 27 may be a region wider or narrower than the range of the field of view of the first user. In order to provide at least the visual recognition of the real world to the first user, it is preferable that the image pickup range of the camera 27 is equivalent to or wider than the range of the field of view of the first user. The image data of the captured image picked up by the camera 27 are output to the smartphone 12. In the present embodiment, the "captured image" refers to an image picked up by the camera 27.

The visual line detection sensor 28 is a sensor that detects the visual line of the first user. A publicly known sensor can be applied as the visual line detection sensor 28, and examples of the visual line detection sensor 28 include a sensor that detects a visual line direction of the first user on the basis of the position of the iris or the pupil. For example, the visual line detection sensor 28 of the present embodiment detects the visual line of the right eye of the first user in the AR glasses 10 of the present embodiment. A detection result of the visual line detection sensor 28 is output to the smartphone 12.

Figure 5:
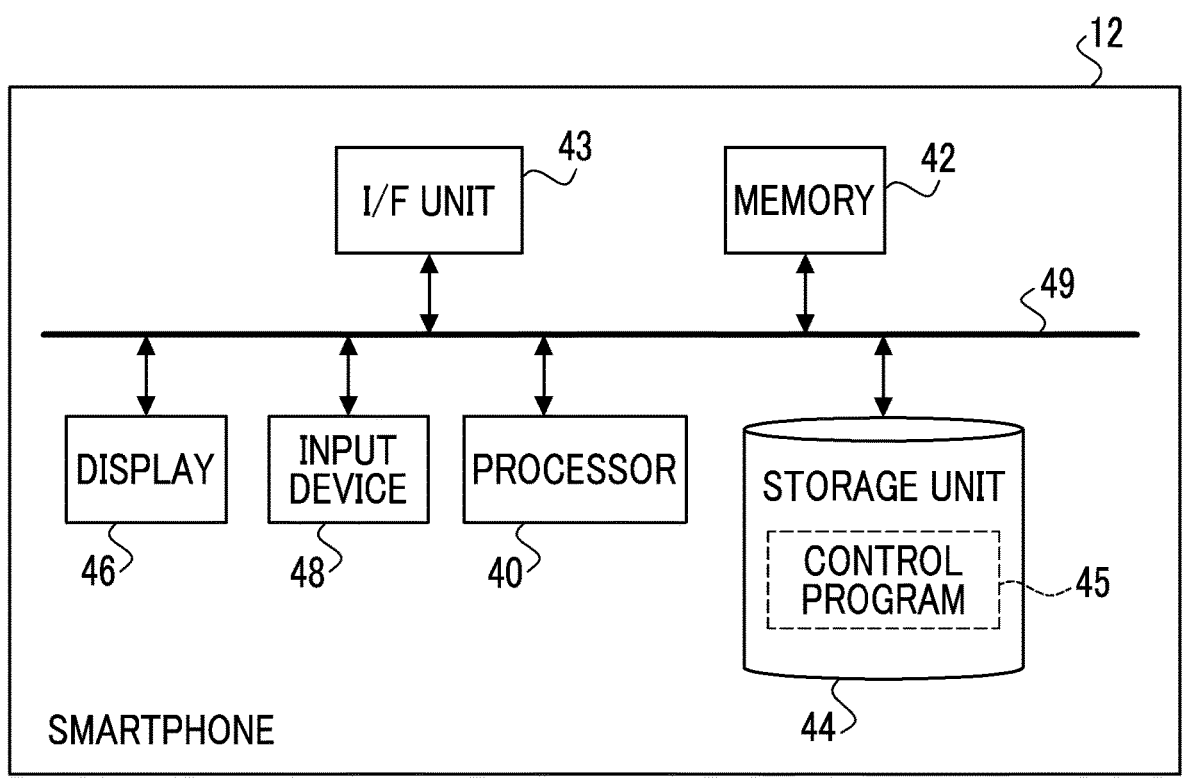
FIG. 5 is a block diagram showing an example of the hardware configuration of the smartphone of the embodiment.

Meanwhile, the smartphone 12 comprises a processor 40 that controls the AR glasses 10. FIG. 5 is a block diagram showing an example of the configuration of the smartphone 12 related to the functions of the present embodiment. As shown in FIG. 5, the smartphone 12 comprises a processor 40, a memory 42, an interface (I/F) unit 43, a storage unit 44, a display 46, and an input device 48. The processor 40, the memory 42, the I/F unit 43, the storage unit 44, the display 46, and the input device 48 are connected to each other via a bus 49, such as a system bus or a control bus, such that various types of information can be given and received therebetween.

The processor 40 reads out various programs, which include a control program 45 stored in the storage unit 44, to the memory 42 and performs processing corresponding to the program read out. The memory 42 is a work memory that is used in a case where the processor 40 performs processing.

The control program 45, various image data (not shown), such as the image data of the captured image picked up by the camera 27, various other types of information, and the like are stored in the storage unit 44. Specific examples of the storage unit 44 include a hard disk drive (HDD), a solid state drive (SSD), and the like.

The I/F unit 43 communicates various types of information to each of the OLED 26L for a left eye, the OLED 26R for a right eye, the camera 27, the visual line detection sensor 28, and the image display device 14 via wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. Further, the input device 48 is operated by a user so that various instructions are input. The input device 48 is not particularly limited, and examples of the input device 48 include a keyboard, a touch pen, a mouse, and the like. A touch panel display in which the display 46 and the input device 48 are integrated with each other is employed in the smartphone 12.

Further, the functions of the smartphone 12 of the present embodiment will be described.

In a case where the first user observes the captured image, which is picked up by the camera 27, using the AR glasses 10 and the second user observes the captured image using the image display device 14, the smartphone 12 of the present embodiment performs a control to output a first image, which is obtained through an image pickup control on the basis of a first region of the captured image, to the AR glasses 10. Further, the smartphone 12 performs a control to output a second image, which is obtained through an image pickup control on the basis of a second region of the captured image, to the image display device 14.

Figure 6:
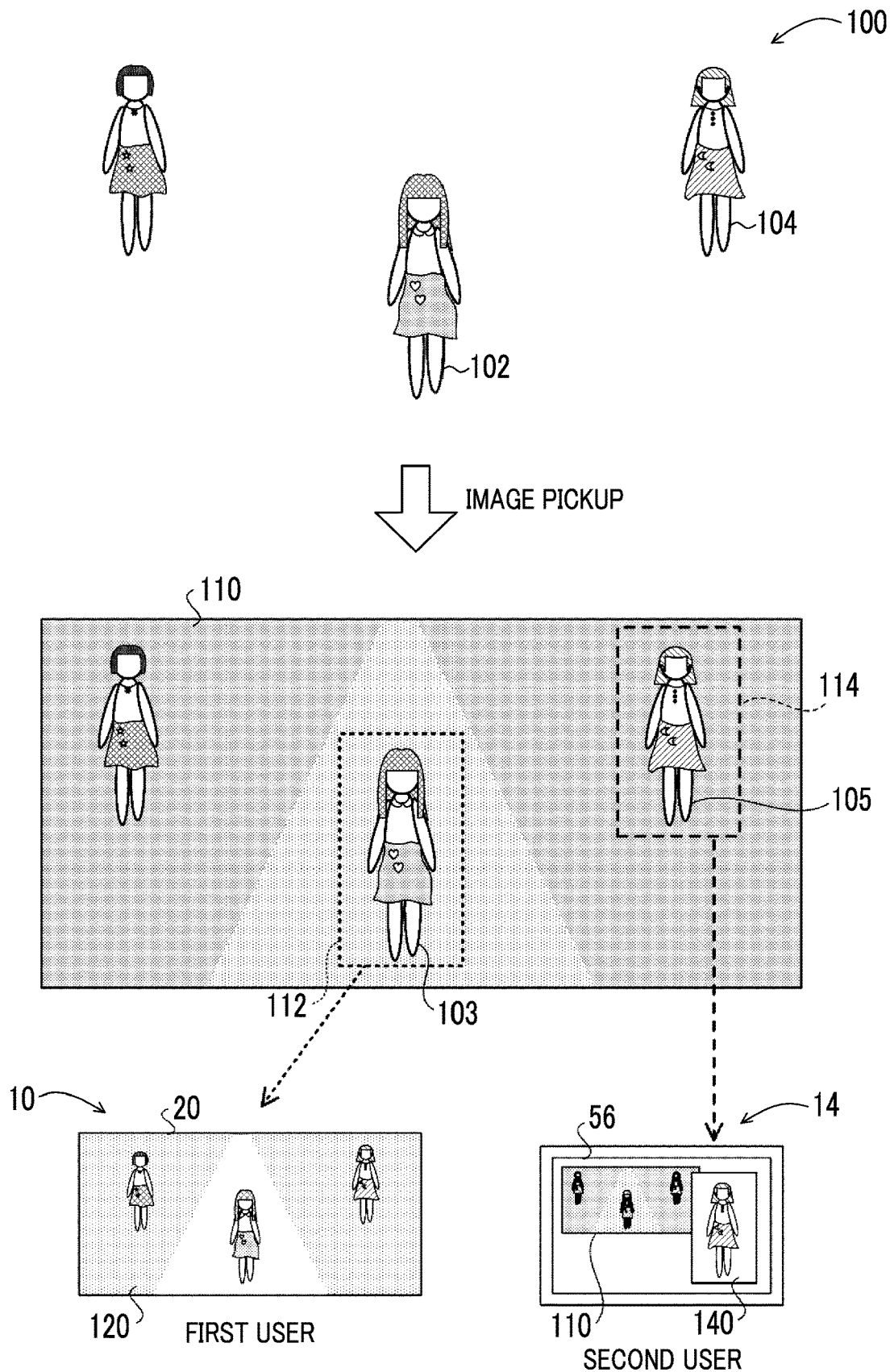
FIG. 6 is a diagram illustrating the visual recognition of a real world using a display of the AR glasses and a display of an image display device.

Here, the first image 120 output to the AR glasses 10 from the smartphone 12 and the second image 140 output to the image display device 14 from the smartphone 12 will be described with reference to FIG. 6. FIG. 6 shows a case where the first user observes the real world 100 using the AR glasses 10 and keeps an eye on a subject 102 present in the real world 100.

The smartphone 12 acquires a captured image 110 of the real world 100 that is picked up by the camera 27. The image display device 14 acquires the captured image 110 from the smartphone 12, and causes the display 56 to display the captured image 110. Accordingly, the second user can observe the real world 100 using the captured image 110. FIG. 6 shows a case where the second user keeps an eye on a subject image 105 of the captured image 110 to observe a subject 104 in the real world 100.

A subject image 103 corresponding to the subject 102 and the subject image 105 corresponding to the subject 104 included in the captured image 110 may appear differently depending on the positions of the subject 102 and the subject 104 present in the real world 100, the position of a light source, or the like. For example, the captured image 110 may be an image in which brightness, a focus, or the like is appropriate for only one of the subject image 103 and the subject image 105.

Accordingly, the smartphone 12 of the present embodiment performs image pickup control on the camera 27 on the basis of a first region 112, which includes the subject image 103 of the captured image 110, to obtain the first image 120 in which the image of the first region 112 is made appropriate and to output first image 120 to the AR glasses 10. The first image 120 is displayed on the display 20 of the AR glasses 10 and is visually recognized by the first user. Further, the smartphone 12 performs image pickup control on the camera 27 on the basis of a second region 114, which includes the subject image 105 of the captured image 110, to obtain the second image 140 in which the image of the second region 114 is made appropriate and to output the second image 140 to the image display device 14. The second image 140 is displayed on the display 56 of the image display device 14 and is visually recognized by the second user.

Therefore, according to the smartphone 12 of the present embodiment, the first image 120 suitable for the visually recognition of the first user can be provided to the first user who uses the AR glasses 10 and the second image 140 suitable for the visually recognition of the second user can be provided to the second user who uses the image display device 14.

Figure 7:
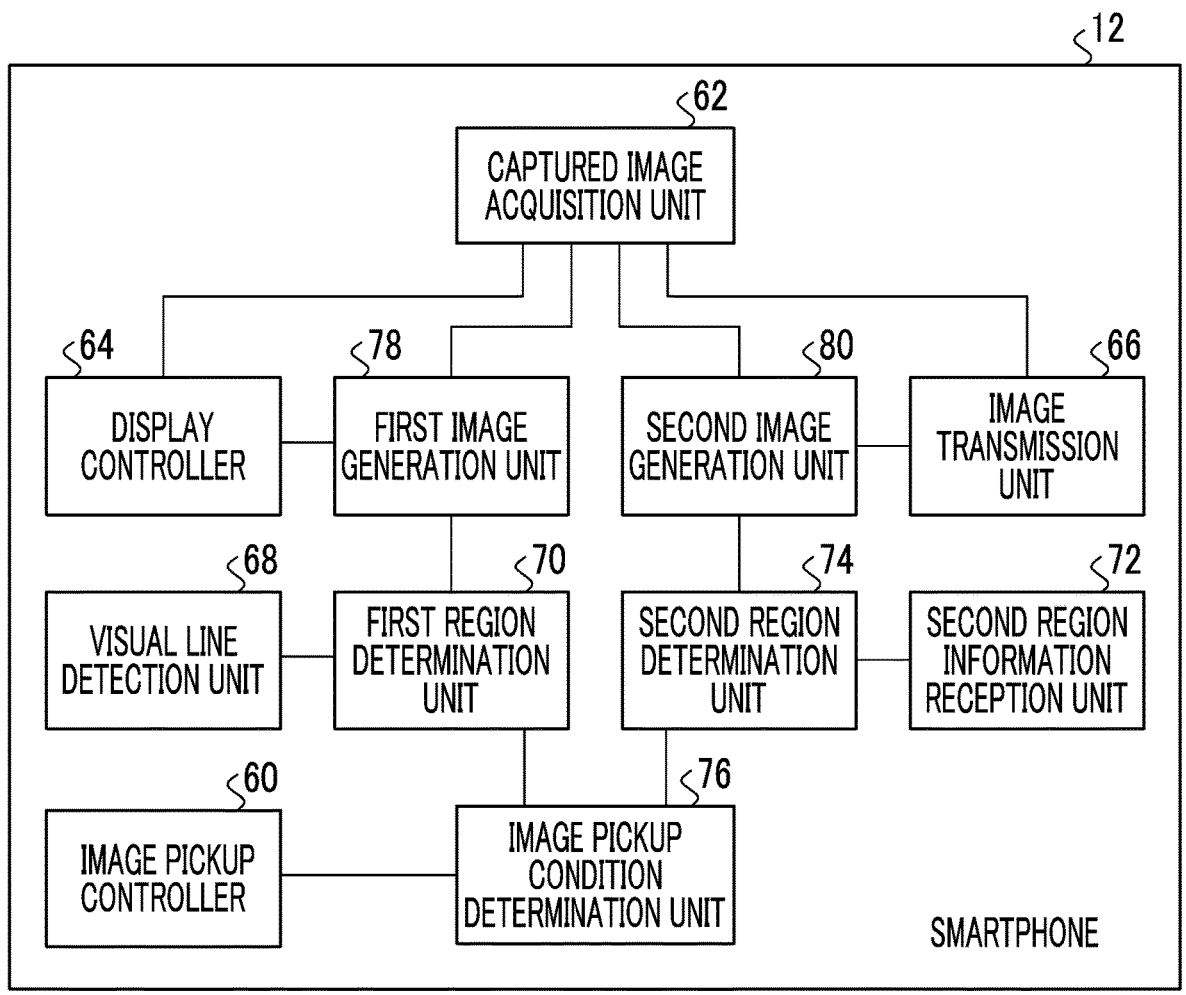
FIG. 7 is a block diagram showing an example of the configuration of the smartphone of the embodiment.

FIG. 7 is a functional block diagram showing an example of a configuration related to the functions of the smartphone 12 of the present embodiment. As shown in FIG. 7, the smartphone 12 comprises an image pickup controller 60, a captured image acquisition unit 62, a display controller 64, an image transmission unit 66, a visual line detection unit 68, a first region determination unit 70, a second region information reception unit 72, a second region determination unit 74, an image pickup condition determination unit 76, a first image generation unit 78, and a second image generation unit 80. For example, the processor 40 of the smartphone 12 of the present embodiment executes the control program 45 stored in the storage unit 44, so that the processor 40 functions as the image pickup controller 60, the captured image acquisition unit 62, the display controller 64, the image transmission unit 66, the visual line detection unit 68, the first region determination unit 70, the second region information reception unit 72, the second region determination unit 74, the image pickup condition determination unit 76, the first image generation unit 78, and the second image generation unit 80.

The image pickup controller 60 has a function of controlling the pickup of the captured image that is performed by the camera 27. The image pickup controller 60 controls the camera 27 to pick up captured images of a plurality of frames as a video while the first user observes the real world 100 using the image displayed on the display 20 of the AR glasses 10.

The captured image acquisition unit 62 has a function of acquiring the captured images that are picked up by the camera 27. Specifically, the captured image acquisition unit 62 acquires image data, which indicate the captured image 110 picked up by the camera 27, from the camera 27 via the I/F unit 43. The captured image acquisition unit 62 appropriately outputs the acquired captured image 110 to the display controller 64, the image transmission unit 66, the first image generation unit 78, and the second image generation unit 80.

The display controller 64 has a function of performing a control to cause the display 20 of the AR glasses 10 to display the captured image 110 or the first image 120.

The image transmission unit 66 has a function of transmitting the captured image 110 and the second image 140 to the image display device 14. Specifically, the image transmission unit 66 transmits image data, which indicate the captured image 110 acquired by the captured image acquisition unit 62, to the image display device 14 via the I/F unit 43. Further, the image transmission unit 66 transmits image data, which indicate the second image 140 generated by the second image generation unit 80, to the image display device 14 via the I/F unit 43.

The visual line detection unit 68 has a function of detecting a visual line direction of the right eye of the first user on the basis of the detection result of the visual line detection sensor 28. The visual line detection unit 68 outputs a detection result to the first region determination unit 70.

The first region determination unit 70 has a function of determining the first region 112 of the captured image 110 on the basis of the detection result of the visual line detection unit 68. In the case shown in FIG. 7, the visual line detection unit 68 detects a direction in which the subject 102 is present as a visual line direction on the basis of the detection result of the visual line detection sensor 28. For example, in the present embodiment, the first region determination unit 70 determines a region, which has a predetermined size and of which a central position is a position in the captured image 110 corresponding to the visual line direction detected by the visual line detection sensor 28, as the first region 112. The predetermined size of the region determined as the first region 112 is not particularly limited, and may be predetermined, for example, in the design of the AR glasses 10 or experimentally. In the example shown in FIG. 7, the subject image 103 corresponding to the subject 102 is included in the first region 112 determined by the first region determination unit 70. The first region determination unit 70 outputs information, which indicates the determined first region 112, to the image pickup condition determination unit 76 and the first image generation unit 78.

The second region information reception unit 72 has a function of receiving information that indicates the second region 114 from the image display device 14. Specifically, the second region information reception unit 72 receives information, which indicates the second region 114, from the image display device 14 via the I/F unit 43. The second region information reception unit 72 outputs the received information, which indicates the second region 114, to the second region determination unit 74.

The second region determination unit 74 has a function of determining the second region 114 of the captured image 110 on the basis of the information that indicates the second region 114. For example, in the case shown in FIG. 7, the second region information reception unit 72 receives the information, which indicates the second region 114, from the image display device 14. The second region determination unit 74 determines the second region 114 of the captured image 110 on the basis of the information that is received by the second region information reception unit 72 and that indicates the second region 114. The second region determination unit 74 outputs the information, which indicates the determined second region 114, to the image pickup condition determination unit 76 and the second image generation unit 80.

Figure 8:
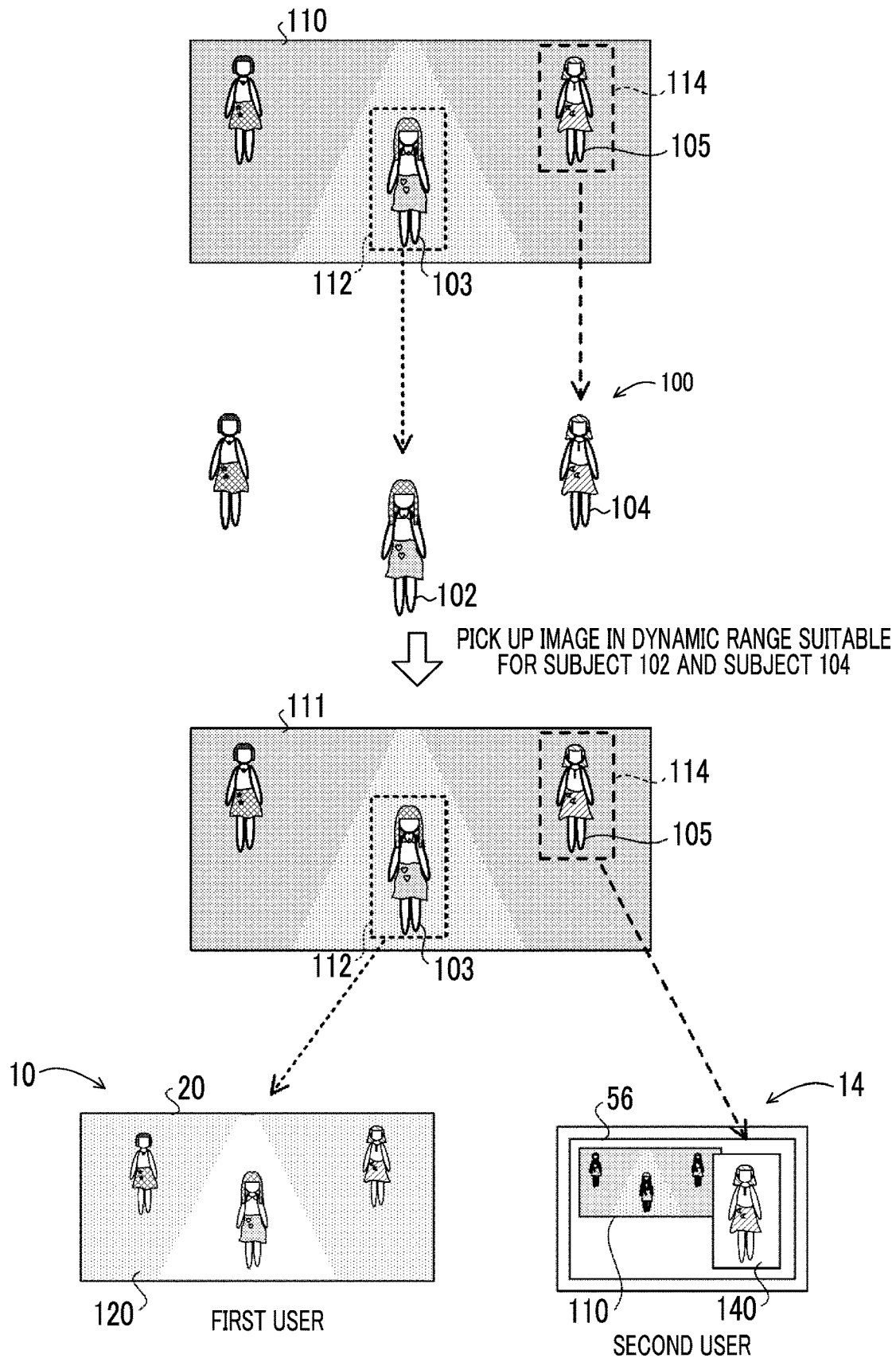
FIG. 8 is a diagram illustrating a first image and a second image of a first embodiment.

As shown in FIG. 8, the image pickup condition determination unit 76 has a function of determining an image pickup condition that is required to pick up a captured image 111 as the source of the first image 120 and the second image 140 by the camera 27 on the basis of the first region 112 and the second region 114 of the captured image 110. The image pickup condition determination unit 76 of the present embodiment determines a dynamic range, which is suitable for the image pickup of the subject 102 corresponding to the subject image 103 included in the first region 112 of the captured image 110 and the image pickup of the subject 104 corresponding to the subject image 105 included in the second region 114, as the image pickup condition. The image pickup condition determination unit 76 outputs the determined image pickup condition to the image pickup controller 60. In the following description, for the sake of simplification, the subject 102 corresponding to the subject image 103 included in the first region 112 will be referred to as "the subject 102 included in the first region 112" and the subject 104 corresponding to the subject image 105 included in the second region 114 will be referred to as "the subject 104 included in the second region 114".

The first image generation unit 78 has a function of generating the first image 120 from the captured image 111, which is picked up by the camera 27 under the image pickup condition determined by the image pickup condition determination unit 76, on the basis of the first region 112 that is determined by the first region determination unit 70. The first image generation unit 78 outputs the generated first image 120 to the display controller 64.

The second image generation unit 80 has a function of generating the second image 140 from the captured image 111, which is picked up by the camera 27 under the image pickup condition determined by the image pickup condition determination unit 76, on the basis of the second region 114 that is determined by the second region determination unit 74. The second image generation unit 80 outputs the generated second image 140 to the image transmission unit 66.

Meanwhile, as described above, the image display device 14 is used for the second user to observe the captured image 110 picked up by the camera 27 of the AR glasses 10 or the second image 140.

Figure 9:
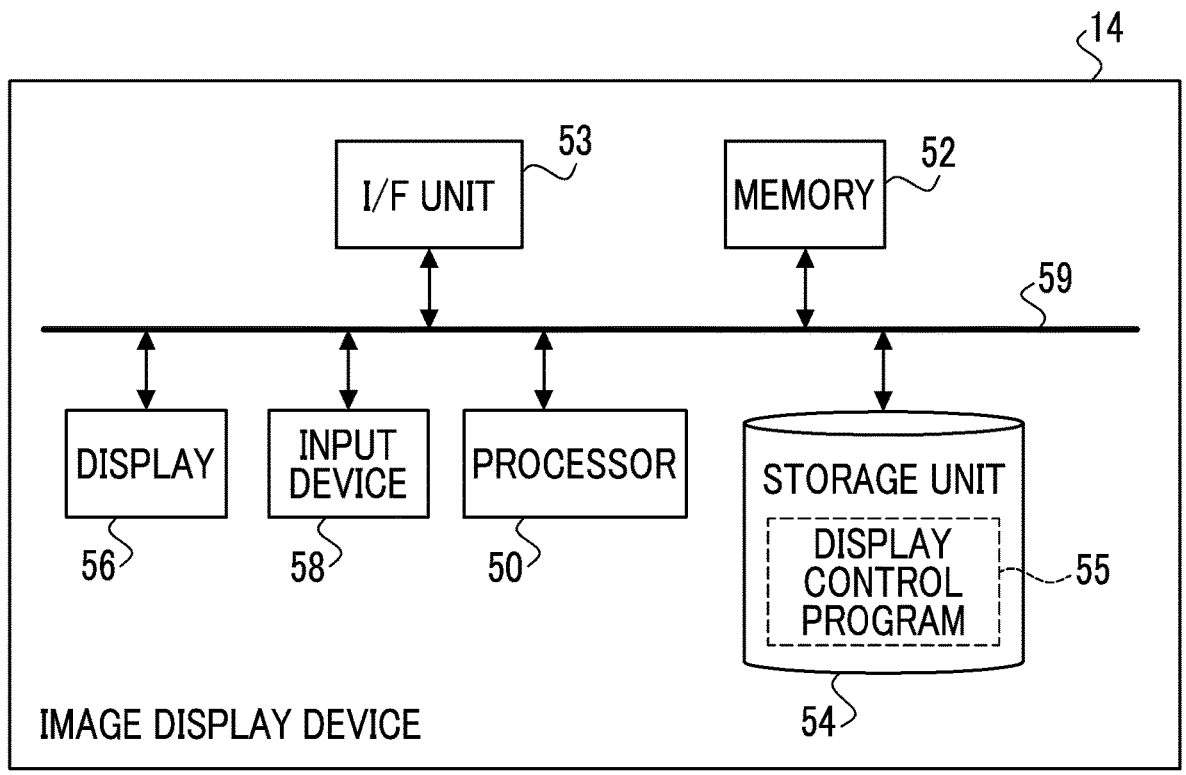
FIG. 9 is a block diagram showing an example of the hardware configuration of the image display device of the embodiment.

FIG. 9 is a functional block diagram showing an example of a configuration related to the functions of the image display device 14. As shown in FIG. 9, the image display device 14 comprises a processor 50, a memory 52, an I/F unit 53, a storage unit 54, a display 56, and an input device 58. The processor 50, the memory 52, the I/F unit 53, the storage unit 54, the display 56, and the input device 58 are connected to each other via a bus 59, such as a system bus or a control bus, such that various types of information can be given and received therebetween.

The processor 50 reads out various programs, which include a display control program 55 stored in the storage unit 54, to the memory 52 and performs processing corresponding to the program read out. The memory 52 is a work memory that is used in a case where the processor 50 performs processing.

The display control program 55, the image data of various images received from the smartphone 12, various other types of information, and the like are stored in the storage unit 54. Specific examples of the storage unit 54 include a HDD, an SSD, and the like.

The I/F unit 53 communicates various types of information to the smartphone 12 via wireless communication or wired communication. The display 56 and the input device 58 function as a user interface. The display 56 displays various images received from the smartphone 12. The display 56 is not particularly limited, and examples of the display 56 include a liquid crystal monitor, a LED monitor, and the like. Further, the input device 58 is operated by the second user so that various instructions related to the second region 114 are input. The input device 58 is not particularly limited, and examples of the input device 58 include a keyboard, a touch pen, a mouse, and the like. A touch panel display in which the display 56 and the input device 58 are integrated with each other may be employed.

Figure 10:
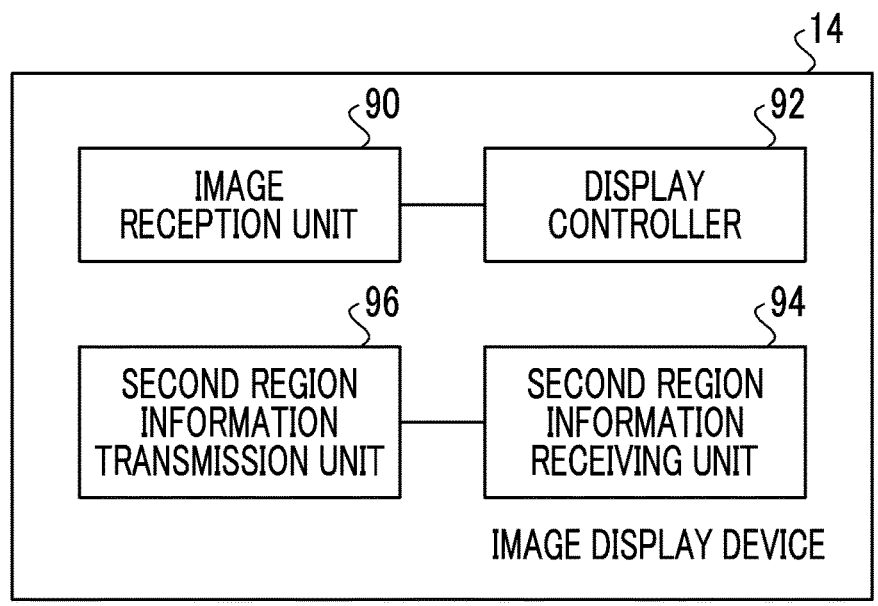
FIG. 10 is a block diagram showing an example of the configuration of the image display device of the embodiment.

FIG. 10 is a functional block diagram showing an example of a configuration related to the functions of the image display device 14 of the present embodiment. As shown in FIG. 10, the image display device 14 comprises an image reception unit 90, a display controller 92, a second region information receiving unit 94, and a second region information transmission unit 96. For example, the processor 50 of the image display device 14 of the present embodiment executes the display control program 55 stored in the storage unit 54, so that the processor 50 functions as the image reception unit 90, the display controller 92, the second region information receiving unit 94, and the second region information transmission unit 96.

The image reception unit 90 has a function of receiving the captured image 110 and the second image 140 from the smartphone 12. Specifically, the image reception unit 90 receives image data, which indicate the captured image 110, and image data, which indicate the second image 140, from the smartphone 12 via the I/F unit 53. The image reception unit 90 outputs the received captured image 110 and the received second image 140 to the display controller 92.

The display controller 92 has a function of performing a control to cause the display 56 to display the captured image 110 or the second image 140 received by the image reception unit 90.

The second region information receiving unit 94 has a function of receiving information that indicates the second region 114 input by the second user using the input device 58. The second region information receiving unit 94 outputs the received information, which indicates the second region 114, to the second region information transmission unit 96.

The second region information transmission unit 96 has a function of outputting the information, which indicates the second region 114, to the smartphone 12. Specifically, the second region information transmission unit 96 outputs the information, which is input from the second region information receiving unit 94 and indicates the second region 114, to the smartphone 12 via the I/F unit 53.

Figure 11:
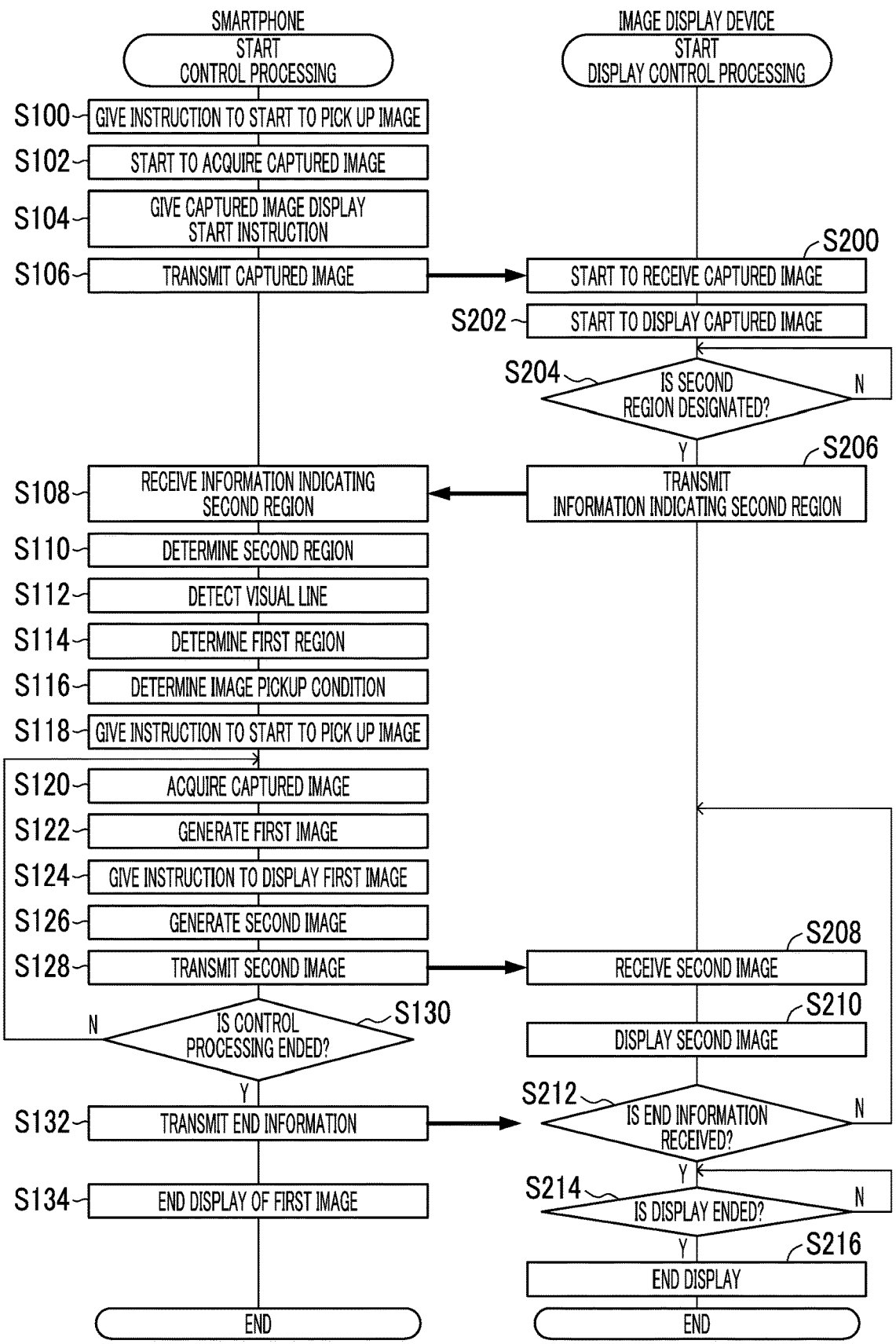
FIG. 11 is a flowchart showing an example of control processing performed by the smartphone of the first embodiment and display control processing performed by the image display device.

Next, the actions of the smartphone 12 and the image display device 14 of the present embodiment will be described. FIG. 11 is a flowchart showing an example of control processing performed by the smartphone 12 of the present embodiment and display control processing performed by the image display device 14. The smartphone 12 executes the control program 45 stored in the storage unit 44 to perform the control processing shown in FIG. 11. Further, the image display device 14 executes the display control program 55 stored in the storage unit 54 to perform the display control processing shown in FIG. 11. For example, in a case where the smartphone 12 receives an instruction to display the captured image on the AR glasses 10 and the image display device 14 that is given by the first user using the input device 48, the control processing and the display control processing shown in FIG. 11 are performed in the present embodiment.

In Step S100 of FIG. 11, the image pickup controller 60 instructs the camera 27 to start to pick up the captured image

110. The camera 27 starts to pick up an image in response to the instruction to start to pick up an image that is input from the smartphone 12. In this case, the camera 27 picks up the captured image 110 at a predetermined frame rate on the basis of a predetermined image pickup condition, such as automatic exposure (AE) or autofocus (AF).

In the next step S102, as described above, the captured image acquisition unit 62 starts to acquire the captured image 110 from the smartphone 12.

In the next step S104, the display controller 64 outputs a captured image display start instruction, which is to start to display the captured image 110 acquired in Step S102 on the display 20 of the AR glasses 10, to the OLED 26L for a left eye and the OLED 26R for a right eye of the AR glasses 10.

Specifically, in order to cause the display 20 of the AR glasses 10 to display the captured image 110, the display controller 64 outputs the projection image for a left eye, which is a partial image of the captured image 110, to the OLED 26L for a left eye and outputs the projection image for a right eye, which is a partial image of the captured image 110, to the OLED 26R for a right eye as described above.

In the next step S106, the image transmission unit 66 transmits the captured image 110, which is acquired in Step S100, to the image display device 14. Although details will be described later, the image display device 14 causes the display 56 to display the captured image 110 received from the smartphone 12, receives the second region 114 of the captured image 110 from the second user, and transmits information, which indicates the second region 114, to the smartphone 12 (Step S206).

Then, in the next step S108, the second region information reception unit 72 receives the information that is transmitted from the image display device 14 and that indicates the second region 114. Examples of the information indicating the second region 114 include information about coordinates that indicate the position and size of the second region 114 in the image display device 14.

In the next step S110, the second region determination unit 74 determines the second region 114 of the captured image 110 on the basis of the information that is received by the second region information reception unit 72 and that indicates the second region 114.

In the next step S112, the visual line detection unit 68 detects the visual line direction of the first user on the basis of the detection result of the visual line detection sensor 28.

In the next step S114, the first region determination unit 70 determines the first region 112 of the captured image 110 as described above on the basis of the visual line direction of the first user that is detected in Step S112.

In the next step S116, the image pickup condition determination unit 76 determines an image pickup condition that is required to pick up the captured image 111 on the basis of the first region 112 and the second region 114 of the captured image 110. As described above, the image pickup condition determination unit 76 of the present embodiment determines an image pickup condition that is required to pick up an image in a dynamic range suitable for both the image pickup of the subject 102 captured in the first region 112 and the image pickup of the subject 104 captured in the second region 114.

In the next step S118, the image pickup controller 60 instructs the camera 27 to start to pick up the captured image 111 under the image pickup condition determined in Step S116. In a case where the camera 27 sets an instructed image pickup condition in response to the instruction to start to pick up the image that is input from the smartphone 12, the camera 27 starts to pick up the captured image 111 and picks up the captured image 111 at a predetermined frame rate.

In the next step S120, the captured image acquisition unit 62 acquires the captured image 111 picked up by the camera 27 in response to the instruction to start to pick up the image given in Step S118.

In the next step S122, the first image generation unit 78 generates the first image 120 from the captured image 111, which is acquired in Step S120, on the basis of the first region 112. For example, the first image generation unit 78 of the present embodiment adjusts the luminance values of pixels of the captured image 111 to luminance values for the AR glasses 10 on the basis of the luminance values of pixels in the first region 112 of the captured image 111 to generate the first image 120. Specifically, the first image generation unit 78 of the present embodiment derives a minimum value of a ratio that allows the luminance values of the pixels of the first region 112 of the captured image 111 to be equal to or larger than predetermined luminance values for the AR glasses 10 and uses a value, which is obtained by multiplying the luminance value of each pixel of the captured image 111 and the derived minimum value together, as the luminance value of each pixel to generate the first image 120.

In the next step S124, the display controller 64 instructs the display 20 of the AR glasses 10 to display the first image 120 generated in Step S122. Specifically, in order to cause the display 20 of the AR glasses 10 to display the first image 120, the display controller 64 outputs a projection image for a left eye, which is a partial image of the first image 120, to the OLED 26L for a left eye and outputs a projection image for a right eye, which is a partial image of the first image 120, to the OLED 26R for a right eye.

In the next step S126, the second image generation unit 80 generates the second image 140 from the captured image 111 acquired in Step S120 on the basis of the second region 114 determined in Step S110. For example, the second image generation unit 80 of the present embodiment adjusts the luminance values of pixels of the captured image 111 to luminance values for the image display device 14 on the basis of the luminance values of pixels of the second region 114 of the captured image 111 to generate the second image 140. Specifically, the second image generation unit 80 of the present embodiment derives a minimum value of a ratio that allows the luminance values of the pixels of the second region 114 of the captured image 111 to be equal to or larger than predetermined luminance values for the image display device 14, and generates a captured image for the image display device 14 in which a value obtained by multiplying the luminance value of each pixel of the captured image 111 and the derived minimum value together is set to the luminance value of each pixel. Further, for example, the second image 140 of the present embodiment is a partial image that is obtained by cutting out a portion corresponding to the second region 114 from the captured image 111. For this reason, the second image generation unit 80 cuts out a portion corresponding to the second region 114 from the captured image 111 for the image display device 14 to generate the second image 140.

In the next step S128, the image transmission unit 66 transmits the second image 140, which is generated in Step S126, to the image display device 14. Although details will be described later, the image display device 14 causes the display 56 to display the second image 140 received from the smartphone 12 (S210).

In the next step S130, the captured image acquisition unit 62 determines whether or not to end the control processing shown in FIG. 11. In the present embodiment, the control processing shown in FIG. 11 ends in a case where a predetermined end condition is satisfied. Examples of the predetermined end condition include a case where the smartphone 12 receives an instruction to end the display of the first image 120 by the AR glasses 10 that is given by the first user using the input device 48. Until the predetermined end condition is satisfied, the determination in Step S130 is a negative determination, the processing returns to Step S120, and the processing of Steps S120 to S128 is repeated. On the other hand, in a case where the predetermined end condition is satisfied, the determination in Step S130 is an affirmative determination and the processing proceeds to Step S132.

In Step S132, the image transmission unit 66 transmits end information indicating that the display of the first image 120 ends in the AR glasses 10 to the image display device 14.

In the next step S134, the display controller 64 outputs an instruction to end the display of the first image 120, which is displayed on the display 20 of the AR glasses 10, to the AR glasses 10. In a case where the processing of Step S134 ends, the control processing shown in FIG. 11 ends.

Meanwhile, in the image display device 14, in Step S200 of FIG. 11, the image reception unit 90 starts to receive the captured image 110 that is transmitted from the smartphone 12 by the processing of the Step S106 of the control processing performed by the above-mentioned smartphone 12.

In the next step S202, the display controller 92 starts to cause the display 56 to display the captured image 110 acquired in Step S200. The second user observes the captured image 110 displayed on the display 56, and designates the second region 114 of the captured image 110 using the input device 58.

Then, in the next step S204, the second region information receiving unit 94 determines whether or not the designation of the second region 114 performed using the input device 58 is received. Until the designation of the second region 114 is received, the determination in Step S204 is a negative determination. On the other hand, in a case where the designation of the second region 114 is received, the determination in Step S204 is an affirmative determination and the processing proceeds to Step S206.

In Step S206, the second region information transmission unit 96 transmits information, which is received by the second region information receiving unit 94 and indicates the second region 114, to the smartphone 12. Accordingly, as described above, in Step S108 of the control processing, the second region information reception unit 72 receives information that indicates the second region 114.

In the next step S208, the image reception unit 90 receives the second image 140 that is transmitted from the smartphone 12 by the processing of Step S128 of the above-mentioned control processing.

In the next step S210, the display controller 92 causes the display 56 to display the second image 140 that is received in Step S208. For example, the display controller 92 of the present embodiment causes the display 56 to display the second image 140 together with the captured image 110 as shown in FIGS. 6 and 8.

In the next step S212, the image reception unit 90 determines whether or not the end information transmitted from the smartphone 12 by the processing of Step S132 of the above-mentioned control processing is received. In a case where the end information is not received, the determination in Step S212 is a negative determination, the processing returns to Step S208, and the processing of Steps S208 and S210 is repeated. On the other hand, in a case where the end information is received, the determination in Step S212 is an affirmative determination and the processing proceeds to Step S214.

In Step S214, the display controller 92 determines whether or not to end the display of the second image 140 and the captured image 110 displayed on the display 56. For example, in the present embodiment, the display controller 92 ends the display of the captured image 110 and the second image 140 in a case where the display controller 92 receives an instruction to end the display of the captured image 110 and the second image 140 that is given by the second user using the input device 58. Then, until the display controller 92 receives an instruction to end the display given by the second user using the input device 58, the determination in Step S214 is a negative determination. On the other hand, in a case where the display controller 92 receives an instruction to end the display given by the second user using the input device 58, the determination in Step S214 is an affirmative determination and the processing proceeds to Step S216. In Step S216, the display controller 92 ends the display of the captured image 110 and the second image 140 on the display 56. In a case where the processing of Step S216 ends, the display control processing shown in FIG. 11 ends.

As described above, the image pickup condition determination unit 76 of the smartphone 12 of the present embodiment determines a dynamic range, which is suitable for the image pickup of the subject 102 captured in the first region 112 and the image pickup of the subject 104 captured in the second region 114, as an image pickup condition. The image pickup controller 60 performs a control to pick up one captured image 111 under the determined image pickup condition by the camera 27. The first image generation unit 78 generates the first image 120 from one captured image 111, and the display controller 64 performs a control to cause the display 20 of the AR glasses 10 to display the first image 120. Further, the second image generation unit 80 generates the second image 140 from one captured image 111, and the image transmission unit 66 outputs the second image 140 to the image display device 14.

Accordingly, according to the smartphone 12 of the present embodiment, it is possible to provide the first image 120 that is suitable for observation performed by the first user and the second image 140 that is suitable for observation performed by the second user.

Second Embodiment

Since the configuration of an image display device 14 of the present embodiment is the same as the configuration of the image display device 14 of the first embodiment (see FIGS. 9 and 10), the description thereof will be omitted. Further, since the configuration of AR glasses 10 is the same as the configuration of the AR glasses 10 of the first embodiment (see FIGS. 1 and 2), the description thereof will be omitted. Meanwhile, the hardware configuration of a smartphone 12 of the present embodiment is the same as the hardware configuration of the smartphone 12 of the first embodiment (see FIG. 5). With regard to a configuration related to the functions of the smartphone 12, as in the first embodiment, the smartphone 12 comprises the image pickup controller 60, the captured image acquisition unit 62, the display controller 64, the image transmission unit 66, the visual line detection unit 68, the first region determination unit 70, the second region information reception unit 72, the second region determination unit 74, the image pickup condition determination unit 76, the first image generation unit 78, and the second image generation unit 80 (see FIG.

7). However, since a part of the functions of the smartphone 12 are different from those of the first embodiment, the different functions will be described.

Figure 12:
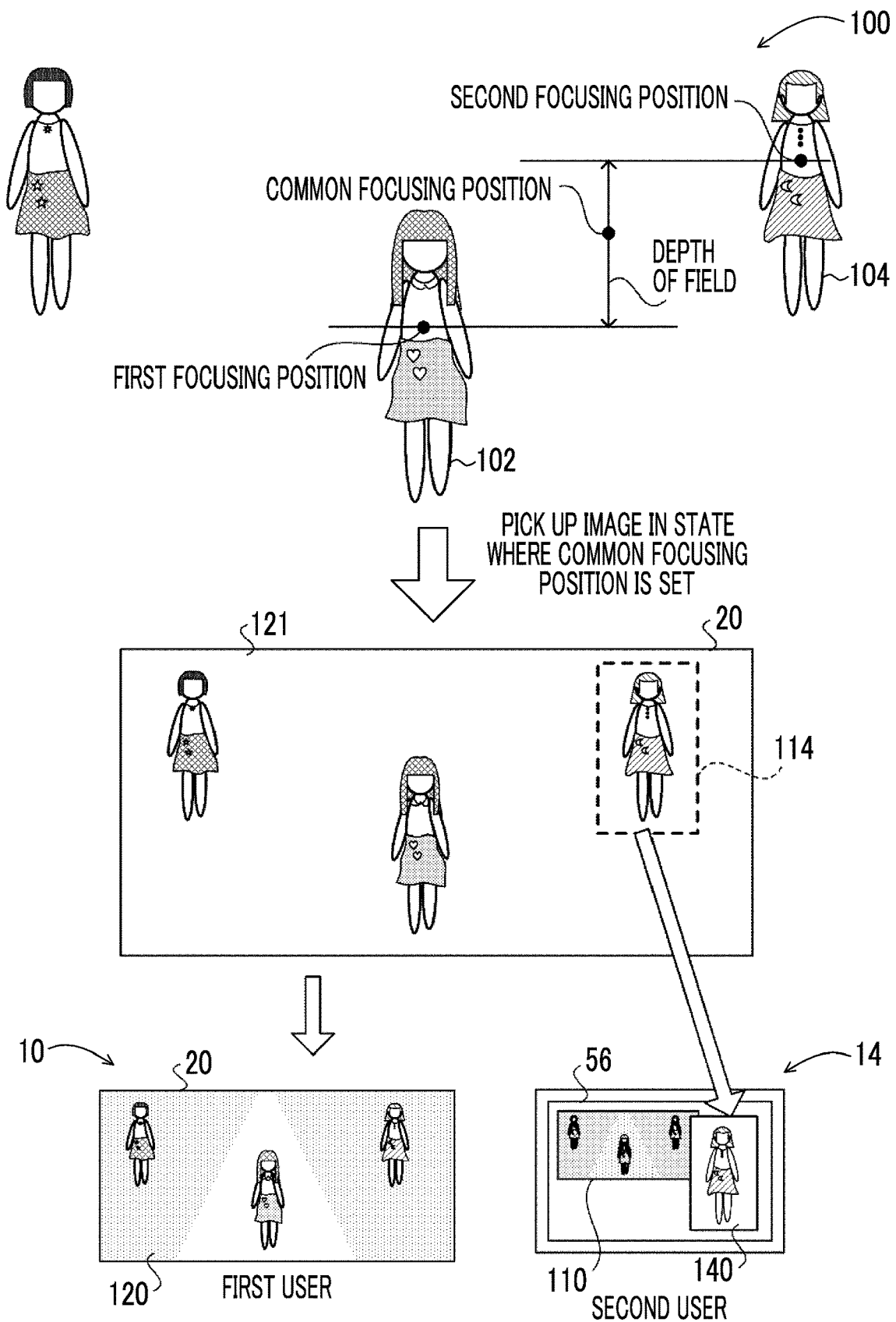
FIG. 12 is a diagram illustrating a first image and a second image of a second embodiment.

As shown in FIG. 12, the image pickup condition determination unit 76 of the present embodiment sets a focusing position of an optical system of the camera 27 to a common focusing position between a first focusing position where the optical system of the camera 27 is focused on a subject 102 captured in a first region 112 (not shown in FIG. 12) of a captured image 110 and a second focusing position where the optical system of the camera 27 is focused on a subject 104 captured in a second region 114 (not shown in FIG. 12) of the captured image 110. Further, the image pickup condition determination unit 76 performs a control to cause the camera 27 to pick up one captured image 121 in a state where the common focusing position is set. In other words, the image pickup condition determination unit 76 causes a depth of field of the camera 27 to be in a range in which at least the subject 102 and the subject 104 are included.

The first image generation unit 78 obtains a first image 120 from the captured image 121 that is picked up by the camera 27 in a state where the common focusing position is set and that is acquired by the captured image acquisition unit 62. For example, the first image generation unit 78 of the present embodiment uses the captured image 121 as the first image 120.

The second image generation unit 80 cuts out the second region 114 from the captured image 121, which is picked up by the camera 27 in a state where the common focusing position is set and which is acquired by the captured image acquisition unit 62, to generate a second image 140.

Figure 13:
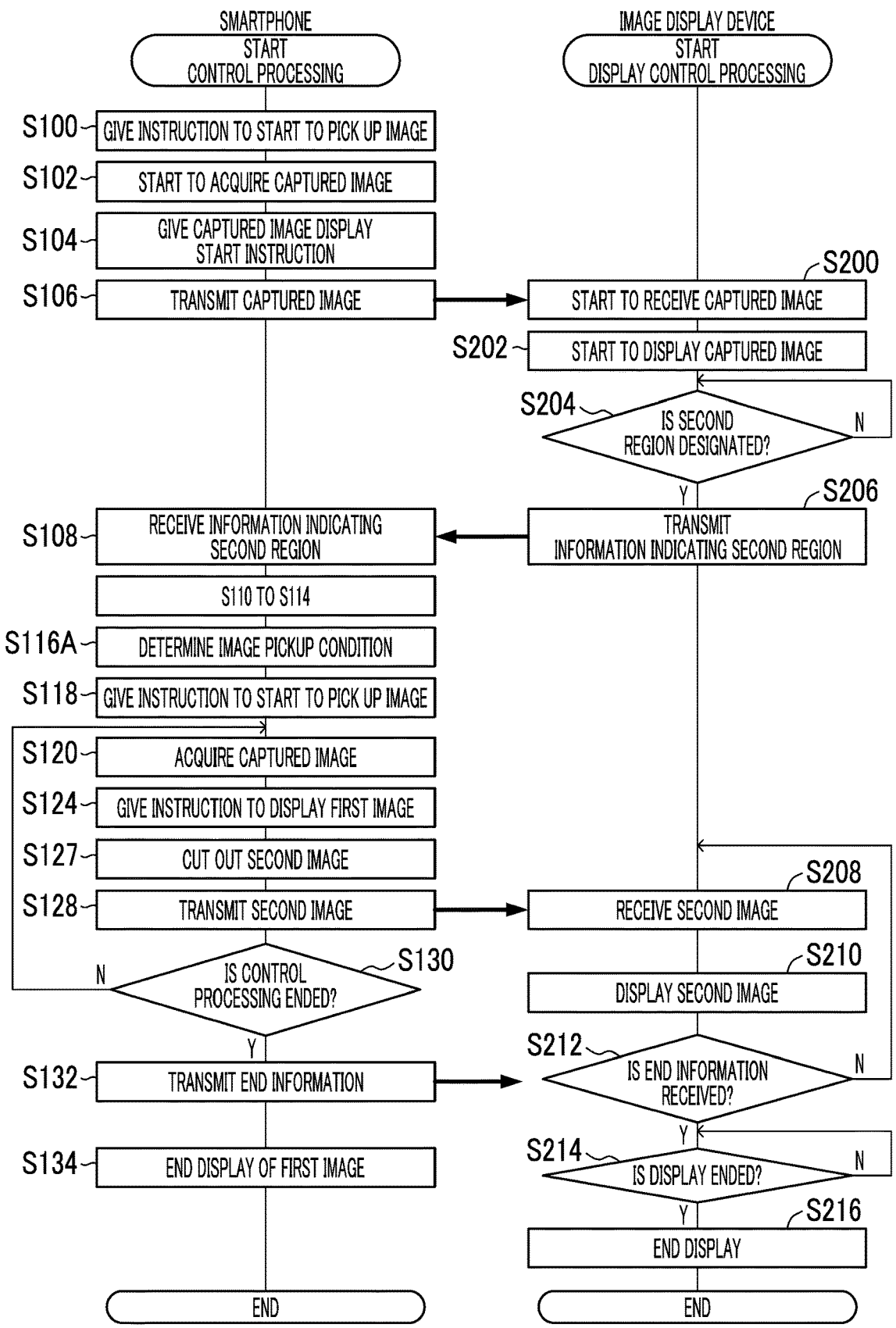
FIG. 13 is a flowchart showing an example of control processing performed by a smartphone of the second embodiment and display control processing performed by an image display device.

FIG. 13 is a flowchart showing an example of control processing performed by the smartphone 12 of the present embodiment and display control processing performed by the image display device 14.

Since the display control processing performed by the image display device 14 of the present embodiment is the same processing as the display control processing (see FIG. 11) performed by the image display device 14 of the first embodiment as shown in FIG. 13, the description thereof will be omitted. On the other hand, the control processing performed by the smartphone 12 of the present embodiment is partially different from the control processing (see FIG. 11) performed by the smartphone 12 of the first embodiment as shown in FIG. 13. The control processing performed by the smartphone 12 of the present embodiment is partially different from the control processing (see FIG. 11) performed by the smartphone 12 of the first embodiment in that the control processing performed by the smartphone 12 of the present embodiment comprises Step S116A instead of Step S116 and comprises Step S127 instead of Step S126 without comprising Step S122.

In Step S116 of FIG. 13, the image pickup condition determination unit 76 determines an image pickup condition that is required to pick up the captured image 111 on the basis of the first region 112 and the second region 114 of the captured image 110. As described above, the image pickup condition determination unit 76 of the present embodiment determines an image pickup condition that is required to set a focusing position of the optical system of the camera 27 to a common focusing position between the first focusing position where the optical system of the camera 27 is focused on the subject 102 and the second focusing position where the optical system of the camera 27 is focused on the subject 104.

Further, since the captured image 121, which is picked up by the camera 27 in a state where the common focusing position is set and which is acquired in Step S120, is used as the first image 120 in the control processing of the present embodiment, the processing of Step S122 having been performed in the control processing of the first embodiment as described above is omitted.

Furthermore, in Step S127, the second image generation unit 80 cuts out a portion corresponding to the second region 114 from the captured image 121, which is acquired in Step S120, to generate the second image 140. Accordingly, in the next step S128, the second image 140 cut out from the captured image 121 is transmitted to the image display device 14.

As described above, the image pickup condition determination unit 76 of the smartphone 12 of the present embodiment determines a common focusing position of the optical system of the camera 27 between the first focusing position where the optical system of the camera 27 is focused on the subject 102 captured in the first region 112 and the second focusing position where the optical system of the camera 27 is focused on the subject 104 captured in the second region 114, as an image pickup condition. The image pickup controller 60 performs a control to cause the camera 27 to pick up one captured image 121 in a state where the common focusing position is set. The first image generation unit 78 uses the captured image 121 as the first image 120. The display controller 64 performs a control to cause the display 20 of the AR glasses 10 to display the first image 120. Further, the second image generation unit 80 cuts out the second image 140 from one captured image 121, and the image transmission unit 66 outputs the second image 140 to the image display device 14.

Accordingly, according to the smartphone 12 of the present embodiment, it is possible to provide the first image 120 that is suitable for observation performed by the first user and the second image 140 that is suitable for observation performed by the second user.

Even in the present embodiment, image processing for the display of the AR glasses 10 may be performed on the captured image 121 to generate the first image 120, and image processing for the display 56 of the image display device 14 may be performed on the captured image 121 to generate the second image 140.

Third Embodiment

Since the configuration of an image display device 14 of the present embodiment is the same as the configuration of the image display device 14 of the first embodiment (see FIGS. 9 and 10), the description thereof will be omitted. Further, since the configuration of AR glasses 10 is the same as the configuration of the AR glasses 10 of the first embodiment (see FIGS. 1 and 2), the description thereof will be omitted. Meanwhile, the hardware configuration of a smartphone 12 of the present embodiment is the same as the hardware configuration of the smartphone 12 of the first embodiment (see FIG. 5). With regard to a configuration related to the functions of the smartphone 12, as in the first embodiment, the smartphone 12 comprises the image pickup controller 60, the captured image acquisition unit 62, the display controller 64, the image transmission unit 66, the visual line detection unit 68, the first region determination unit 70, the second region information reception unit 72, the second region determination unit 74, the image pickup condition determination unit 76, the first image generation unit 78, and the second image generation unit 80 (see FIG. 7). However, since a part of the functions of the smartphone 12 are different from those of the first embodiment, the different functions will be described.

Figure 14:
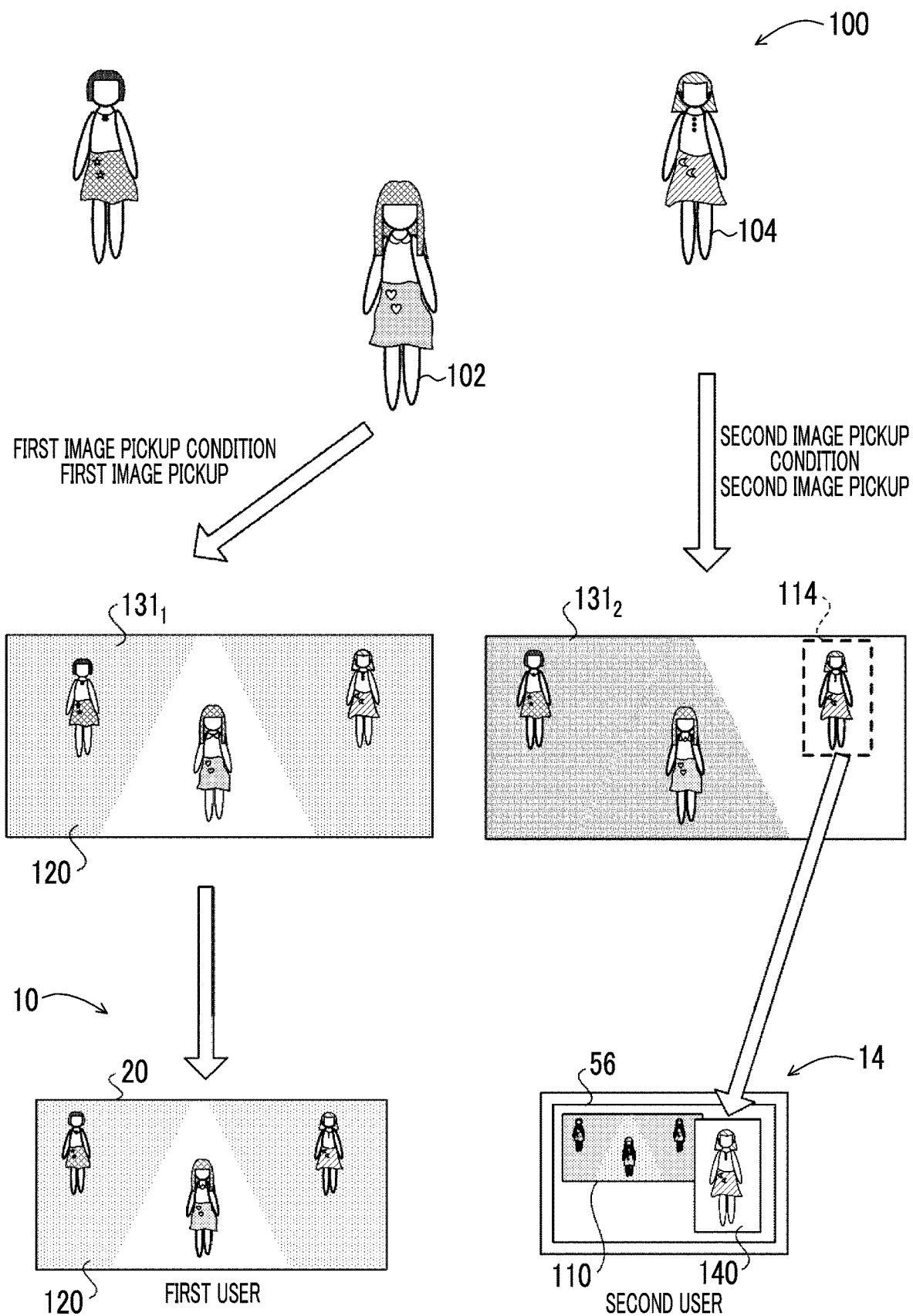
FIG. 14 is a diagram illustrating a first image and a second image of a third embodiment.

As shown in FIG. 14, the image pickup condition determination unit 76 of the present embodiment determines a first image pickup condition under which the exposure of the camera 27 is controlled on the basis of a subject 102 and a second image pickup condition under which the exposure of the camera 27 is controlled on the basis of a subject 104, as image pickup conditions.

The first image generation unit 78 uses a captured image $131_1$, which is picked up by the camera 27 under the first image pickup condition under which the exposure of the camera 27 is controlled on the basis of the subject 102, as a first image 120. The captured image $131_1$ of the present embodiment is an example of a first captured image of the present disclosure.

The second image generation unit 80 cuts out a second region 114 from a captured image $131_2$, which is picked up by the camera 27 under the second image pickup condition under which the exposure of the camera 27 is controlled on the basis of the subject 104, to generate a second image 140. The captured image $131_2$ of the present embodiment is an example of a second captured image of the present disclosure.

Figure 15:
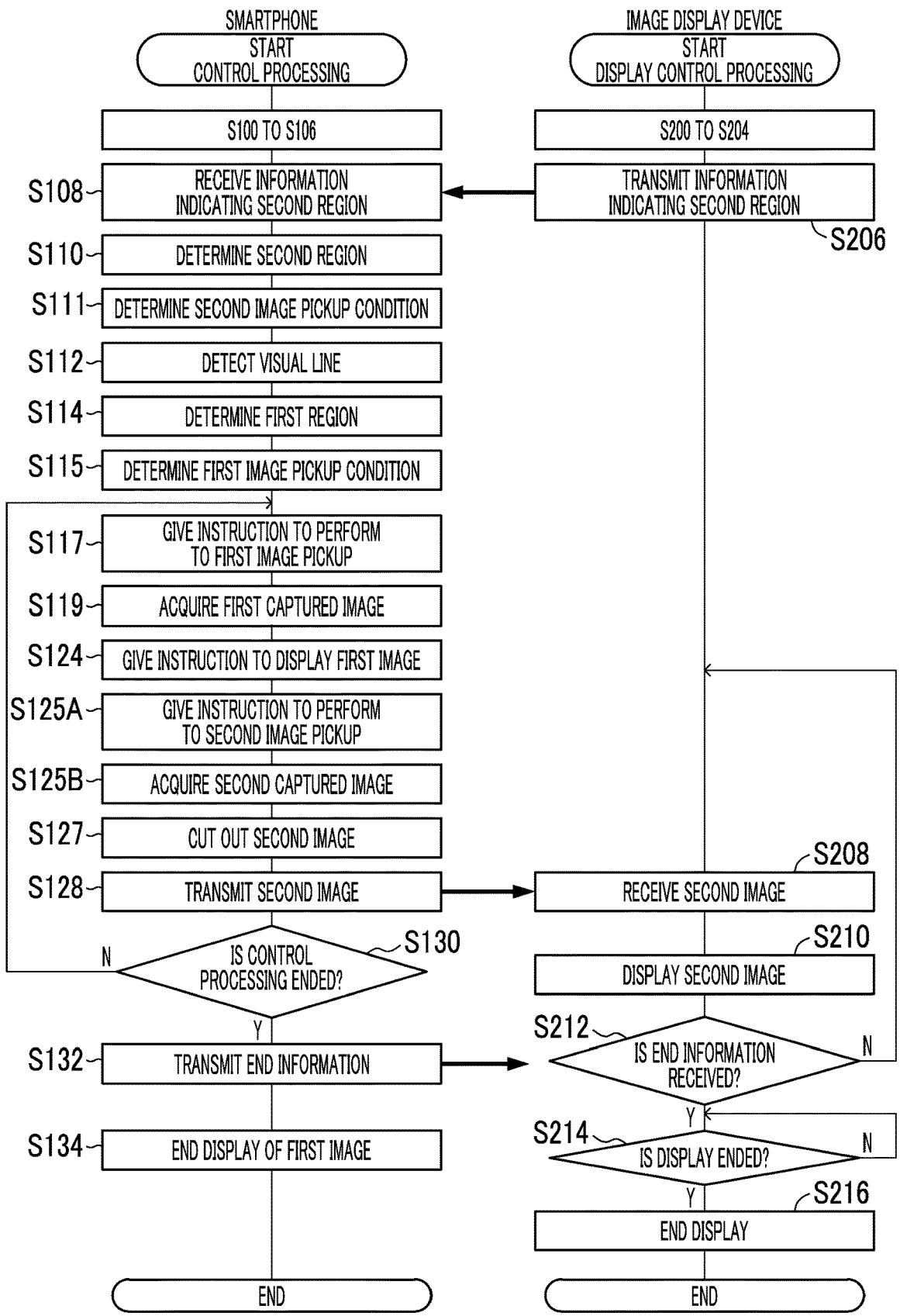
FIG. 15 is a flowchart showing an example of control processing performed by a smartphone of the third embodiment and display control processing performed by an image display device.

FIG. 15 is a flowchart showing an example of control processing performed by the smartphone 12 of the present embodiment and display control processing performed by the image display device 14.

Since the display control processing performed by the image display device 14 of the present embodiment is the same processing as the display control processing (see FIG. 11) performed by the image display device 14 of the first embodiment as shown in FIG. 15, the description thereof will be omitted. On the other hand, the control processing performed by the smartphone 12 of the present embodiment is partially different from the control processing (see FIG. 11) performed by the smartphone 12 of the first embodiment as shown in FIG. 15. The control processing performed by the smartphone 12 of the present embodiment is partially different from the control processing (see FIG. 11) performed by the smartphone 12 of the first embodiment in that the control processing performed by the smartphone 12 of the present embodiment comprises Step S111 between Step S110 and Step S112, comprises Step S115 instead of Step S116, comprises Steps S117 and S119 instead of Steps S116 to S122, and comprises Steps S125A, S125B, and S127 instead of Step S126.

In Step S111 of FIG. 15, as described above, the image pickup condition determination unit 76 determines the second image pickup condition under which the exposure of the camera 27 is controlled on the basis of the subject 104 included in the second region 114 of the captured image $131_2$.

Further, in Step S115 of FIG. 15, as described above, the image pickup condition determination unit 76 determines the first image pickup condition under which the exposure of the camera 27 is controlled on the basis of the subject 102 included in a first region 112 of the captured image $131_1$.

In the next step S117, the image pickup controller 60 instructs the camera 27 to start to pick up the captured image $131_1$ (first image pickup) under the first image pickup condition determined in Step S115. In a case where the instructed first image pickup condition is set in response to the instruction of the first image pickup input from the smartphone 12, the camera 27 picks up the captured image $131_1$.

In the next step S119, the captured image acquisition unit 62 acquires the captured image $131_1$ that is picked up by the camera 27 in response to the instruction of the first image pickup in Step S117. Further, the first image generation unit 78 uses the captured image $131_1$ as the first image 120 as described above. Accordingly, in the next step S124, the display controller 64 instructs the display 20 of the AR glasses 10 to display the first image 120 that is the captured image $131_1$.

Furthermore, in Step S125A of FIG. 15, the image pickup controller 60 instructs the camera 27 to start to pick up the captured image $131_2$ (second image pickup) under the second image pickup condition determined in Step S111. In a case where the instructed second image pickup condition is set in response to the instruction of the second image pickup input from the smartphone 12, the camera 27 picks up the captured image $131_2$.

In the next step S125B, the captured image acquisition unit 62 acquires the captured image $131_2$ that is picked up by the camera 27 in response to the instruction of the second image pickup in Step S125A.

In the next step S127, as described above, the second image generation unit 80 cuts out a portion corresponding to the second region 114 from the captured image $131_2$, which is acquired in Step S125B, to generate the second image 140. Accordingly, in the next step S128, the second image 140 cut out from the captured image $131_2$ is transmitted to the image display device 14.

As described above, the image pickup condition determination unit 76 of the smartphone 12 of the present embodiment determines the exposure of the camera 27 on the basis of the subject 102 captured in the first region 112 as the first image pickup condition. The image pickup controller 60 performs a control to cause the camera 27 to pick up the first captured image $131_1$ under the first image pickup condition. The first image generation unit 78 uses the first captured image $131_1$ as the first image 120, and the display controller 64 performs a control to cause the display 20 of the AR glasses 10 to display the first image 120.

Further, the image pickup condition determination unit 76 determines the exposure of the camera 27 on the basis of the subject 104 captured in the second region 114 as the second image pickup condition. The image pickup controller 60 performs a control to cause the camera 27 to pick up the second captured image $131_2$ under the second image pickup condition. The second image generation unit 80 cuts out the second image 140 from the second captured image $131_2$, and the image transmission unit 66 outputs the second image 140 to the image display device 14.

Accordingly, according to the smartphone 12 of the present embodiment, it is possible to provide the first image 120 that is suitable for observation performed by the first user and the second image 140 that is suitable for observation performed by the second user.

As described above, the smartphone 12 of the present embodiment includes the processor 40. In a case where the first user observes the captured image, which is picked up by the camera 27 of the AR glasses 10, using the AR glasses 10 and the second user observes the captured image using the image display device 14 different from the AR glasses 10, the processor 40 performs a control to output the first image 120, which is obtained through an image pickup control on the basis of the first region 112 of the captured image 110, to the AR glasses 10 and to output the second image 140, which is obtained through an image pickup control on the basis of the second region 114 of the captured image 110, to the image display device 14.

For example, since the surroundings of the subject 102 and the surroundings of the subject 104 are different from each other as in a case where the subject 102 observed by the first user and the subject 104 observed by the second user are positioned at a distance from each other, the first region 112 and the second region 114 of the captured image 110 may look different from each other. According to the smartphone 12 of the present embodiment, even in such a case, it is possible to provide the first image 120 that is suitable for observation performed by the first user using the AR glasses 10 and the second image 140 that is suitable for observation performed by the second user using the image display device 14.

An aspect in which the AR glasses 10 are applied as an example of the glasses-type display device of the present disclosure has been described in each of the above-mentioned embodiments, but the glasses-type display device is not limited to the AR glasses 10 and can be applied in various forms, such as a head-mounted display.

Further, a word "glasses" in "glasses-type display device" means functionally realizing a first sensor (human eye) that acquires an image and a second sensor (the camera 27 of the AR glasses 10) that includes a visual field of the first sensor and that acquires a captured image in substantially the same visual line direction as the first sensor. The shape of the glasses-type display device is not limited to the shape of general glasses, a use, and a wearing portion. Furthermore, the glasses-type display device may be a monocular type or a compound-eye type. An aspect in which a projection image is visually recognized with both eyes has been described in each of the above-mentioned embodiments, but a projection image may be visually recognized with one eye. The glasses-type display device may have a shape in which left and right portions are connected to each other like goggles. Moreover, the glasses-type display device is not limited to a device that is worn on a human head like a so-called head-mounted display. (For example, the glasses-type display device may be applied to a robot having the shape of a dog while imitating a human function. In a case where a function of a human eye is realized by a camera provided on the knee of the robot, the display device of the present disclosure is mounted on the knee.) Even such a display device is included in a technique of the present disclosure.

Further, an aspect in which the AR glasses 10 comprise one camera 27 and this camera 27 picks up captured images 110 and 111 corresponding to the entire visual field of the first user has been described in each of the above-mentioned embodiments, but the camera of the AR glasses 10 is not limited to this aspect. For example, the AR glasses 10 may comprise two cameras, that is, a camera that picks up a projection image for a left eye and a camera that picks up a projection image for a right eye. In this case, in a case where the second region 114 is included in one of the projection image for a left eye and the projection image for a right eye, for example, in the third embodiment, only a projection image in which the second region 114 is included may be picked up.

Furthermore, a case where the first user and the second user are different from each other has been described in each of the above-mentioned embodiments, but the first user and the second user may be the same. Moreover, a case where each of the first user and the second user is one person has been described in each of the above-mentioned embodiments, but each of the first user and the second user may be a plurality of persons.

Further, an aspect in which the image display system 1 comprises one image display device 14 has been described in each of the above-mentioned embodiments, but the number of image display devices 14 comprised in the image display system 1 is not limited. In a case where the image display system 1 comprises a plurality of image display devices 14, operations performed on the image display device 14 by the smartphone 12 described in each of the above-mentioned embodiments may be sequentially performed on each of the image display devices 14 of the image display system 1.

Furthermore, the second image 140 is an image cut out from each of the captured images 111, 121, and $131_2$ in each of the above-mentioned embodiments. However, the present disclosure is not limited to the embodiments and each of the captured images 111, 121, and $131_2$ may be used as the second image 140.

Moreover, in each of the above-mentioned embodiments, the smartphone 12 has the functions of the image pickup controller 60, the captured image acquisition unit 62, the display controller 64, the image transmission unit 66, the visual line detection unit 68, the first region determination unit 70, the second region information reception unit 72, the second region determination unit 74, the image pickup condition determination unit 76, the first image generation unit 78, and the second image generation unit 80. However, another device may have some or all of the functions of these units. For example, the other device may be the image display device 14 or may be a server computer provided on the cloud, or the like. For example, the smartphone 12 generates the second image 140 in each of the above-mentioned embodiments, but information required to generate the second image 140 and each of the captured images 111, 121, and $131_2$ may be transmitted to the image display device 14 and the image display device 14 may generate the second image 140 from each of the captured images 111, 121, and $131_2$ on the basis of the received information required to generate the second image 140.

Further, the following various processors can be used in each of the above-mentioned embodiments as the hardware structures of processing units, which perform various types of processing, such as the image pickup controller 60, the captured image acquisition unit 62, the display controller 64, the image transmission unit 66, the visual line detection unit 68, the first region determination unit 70, the second region information reception unit 72, the second region determination unit 74, the image pickup condition determination unit 76, the first image generation unit 78, and the second image generation unit 80 of the smartphone 12 or the image reception unit 90, the display controller 92, the second region information receiving unit 94, and the second region information transmission unit 96 of the image display device 14. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). Further, a plurality of processing units may be formed of one processor.

As an example where a plurality of processing units are formed of one processor, first, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

In addition, more specifically, electrical circuitry where circuit elements, such as semiconductor elements, are combined can be used as the hardware structures of these various processors.

Further, an aspect in which the control program 45 is stored (installed) in the storage unit 44 in advance and the display control program 55 is stored (installed) in the storage unit 54 in advance has been described in each of the above-mentioned embodiments, but the present disclosure is not limited thereto. The control program 45 and the display control program 55 may be provided in forms where the control program 45 and the display control program 55 are recorded in recording mediums, such as a compact disc read only memory (CD-ROM), a digital versatile disc read only memory (DVD-ROM), and a universal serial bus (USB) memory. Furthermore, the control program 45 and the display control program 55 may be downloaded from external devices via a network.

What is claimed is:

1. A control device comprising:
   at least one processor,
   wherein the control device is used in an image display system in which a first user observes a first image related to a captured image, which is picked up by a camera of a glasses-type display device, using the glasses-type display device and a second user observes a second image related to the captured image using a display device different from the glasses-type display device, and
   wherein the processor is configured to:
      perform a control to set a focusing position of an optical system of the camera between a first focusing position where the optical system is focused on a first subject captured in a first region of the captured image and a second focusing position where the optical system is focused on a subject captured in a second region different from the first region of the captured image, and to cause the camera to pick up one captured image in a state in which the focusing position is set,
      output the one captured image as the first image to the glasses-type display device, and
      output an image which is generated from the second region of the one captured image, as the second image, to the display device.

2. The control device according to claim 1,
   wherein the second image is a partial image that is obtained by cutting out the second region from the captured image.

3. The control device according to claim 1,
   wherein the processor is configured to determine the first region on the basis of a visual line of the first user that is detected by a visual line detection device.

4. A control device comprising:
   at least one processor,
   wherein the control device is used in an image display system in which a first user observes a first image related to a captured image, which is picked up by a camera of a glasses-type display device, using the glasses-type display device and a second user observes a second image related to the captured image using a display device different from the glasses-type display device, and
   wherein the processor is configured to:
      output a first captured image, which is picked up in a state in which an exposure of the camera is controlled on the basis of a first subject captured in a first region of the captured image, as the first image, to the glasses-type display device, and
      output an image generated from a second captured image, which is picked up in a state in which an exposure of the camera is controlled on the basis of a second subject captured in a second region which is different from the first region of the captured image, as the second image, to the display device.

5. The control device according to claim 4,
   wherein the second image is a partial image that is obtained by cutting out the second region from the captured image.

6. The control device according to claim 4,
   wherein the processor is configured to determine the first region on the basis of a visual line of the first user that is detected by a visual line detection device.

7. A control method that is performed by a processor included in a control device, wherein the control device is used in an image display system in which a first user observes a first image related to a captured image, which is picked up by a camera of a glasses-type display device, using the glasses-type display device and a second user observes a second image related to the captured image using a display device different from the glasses-type display device,
   the method comprising:
      performing a control to set a focusing position of an optical system of the camera between a first focusing position where the optical system is focused on a first subject captured in a first region of the captured image and a second focusing position where the optical system is focused on a subject captured in a second region different from the first region of the captured image, and to cause the camera to pick up one captured image in a state in which the focusing position is set,
      outputting the one captured image as a first image, to the glasses-type display device and
      outputting an image, which is generated from the second region of the one captured image, as the second image, to the display device.

8. A non-transitory storage medium storing a control program that is executable by a processor included in a control device, wherein the control device is used in an image display system in which a first user observes a first image relate to a captured image, which is picked up by a camera of a glasses-type display device, using the glasses-type display device and a second user observes a second image related to the captured image using a display device different from the glasses-type display device, the control program causing the processor to perform a control comprising:
      performing a control to set a focusing position of an optical system of the camera between a first focusing position where the optical system is focused on a first subject captured in a first region of the captured image and a second focusing position where the optical system is focused on a subject captured in a second region different from the first region of the captured image, and to cause the camera to pick up one captured image in a state in which the focusing position is set, outputting the captured image as a first image, to the glasses-type display device, and outputting an image, which is generated from the second region of the one captured image, as the second image, to the display device.

9. A control method that is performed by a processor included in a control device, wherein the control device is used in an image display system in which a first user observes a first image related to a captured image, which is picked up by a camera of a glasses-type display device, using the glasses-type display device and a second user observes a second image related to the captured image using a display device different from the glasses-type display device, the method comprising:

outputting a first captured image, which is picked up in a state in which an exposure of the camera is controlled on the basis of a first subject captured in a first region of the captured image, as the first image, to the glasses-type display device, and outputting an image generated from a second captured image, which is picked up in a state in which an exposure of the camera is controlled on the basis of a second subject captured in a second region which is different from the first region of the captured image, as the second image, to the display device.

10. A non-transitory storage medium storing a control program that is executable by a processor included in a control device, wherein the control device is used in an image display system in which a first user observes a first image relate to a captured image, which is picked up by a camera of a glasses-type display device, using the glasses-type display device and a second user observes a second image related to the captured image using a display device different from the glasses-type display device, the control program causing the processor to perform a control comprising:

outputting a first captured image, which is picked up in a state in which an exposure of the camera is controlled on the basis of a first subject captured in a first region of the captured image, as the first image, to the glasses-type display device, and outputting an image generated from a second captured image, which is picked up in a state in which an exposure of the camera is controlled on the basis of a second subject captured in a second region which is different from the first region of the captured image, as the second image, to the display device.

* * * * *